US012502063B2

United States Patent
Kammer et al.

(10) Patent No.: US 12,502,063 B2
(45) Date of Patent: Dec. 23, 2025

(54) LOW LUMINANCE MOBILITY TEST

(71) Applicant: jCyte, Inc., Newport Beach, CA (US)

(72) Inventors: Rebecca Kammer, Anaheim, CA (US); Steven Wang, Irvine, CA (US); Aurelie Calabrese, Marseilles (FR); Lisa Nguyen, Irvine, CA (US); Terry Tsang, Irvine, CA (US); Ava K. Bittner, Los Angeles, CA (US)

(73) Assignee: jCyte, Inc., Newport Beach, CA (US)

( * ) Notice: Subject to any disclaimer, the term of this patent is extended or adjusted under 35 U.S.C. 154(b) by 319 days.

(21) Appl. No.: 18/264,032

(22) PCT Filed: Feb. 1, 2022

(86) PCT No.: PCT/US2022/014704
§ 371 (c)(1),
(2) Date: Aug. 2, 2023

(87) PCT Pub. No.: WO2022/169748
PCT Pub. Date: Aug. 11, 2022

(65) Prior Publication Data
US 2024/0315549 A1    Sep. 26, 2024

Related U.S. Application Data

(60) Provisional application No. 63/145,228, filed on Feb. 3, 2021.

(51) Int. Cl.
*A61B 3/06* (2006.01)
*A61B 3/00* (2006.01)
(Continued)

(52) U.S. Cl.
CPC ............ *A61B 3/063* (2013.01); *A61B 3/0008* (2013.01); *A61B 5/1128* (2013.01); *A61B 5/72* (2013.01)

(58) Field of Classification Search
CPC ......... A61B 3/063; A61B 3/0008; A61B 3/02; A61B 5/1128; A61B 5/72; A61B 5/16; A61B 5/112; A61B 5/4842
(Continued)

(56) References Cited

U.S. PATENT DOCUMENTS 10,448,823 B2    10/2019    High et al.
2015/0116667 A1    4/2015    High et al.
(Continued)

FOREIGN PATENT DOCUMENTS

| JP | 2014-104032 A | 6/2014 |
|---|---|---|
| RU | 2634682 C1 | 11/2017 |
| WO | WO 1991/000050 A1 | 1/1994 |

OTHER PUBLICATIONS

Black, A. et al. "Mobility performance with retinitis pigmentosa," Clinical and Experimental Optometry, 1997, 80(1):1-12.
(Continued)

*Primary Examiner* — William R Alexander
(74) *Attorney, Agent, or Firm* — Fenwick & West LLP; Matthew Pavao

(57) ABSTRACT

The present disclosure relates to systems and methods for testing functional vision of a subject. The systems and methods utilize a plurality of obstacle courses, a plurality of contrast levels of the obstacle courses, a plurality of illumination levels, video-recording, and a robust scoring algorithm to assess the mobility of the subject.

20 Claims, 17 Drawing Sheets

(51) Int. Cl.
*A61B 5/00* (2006.01)
*A61B 5/11* (2006.01)

(58) Field of Classification Search
USPC .......................................... 351/243
See application file for complete search history.

(56) References Cited

U.S. PATENT DOCUMENTS

2017/0319058 A1* 11/2017 High ................. A61B 3/063
2021/0112226 A1* 4/2021 Abou ................. G02B 27/017

OTHER PUBLICATIONS

Chung et al., "Novel mobility test to assess function vision in patients with inherited retinal dystrophies," Clin. Exp. Ophthalmol., Apr. 2018, 46(3):247-259, 27 pages total.
Kuyk, T. et al. "Visual factors and mobility in persons with age-related macular degeneration," Journal of rehabilitation research and development, Oct. 1999, 36(4), 17 pages.

* cited by examiner

FIG. 15

| Time start (sec) | Time end (sec) | Total time (calculated) | Unadjusted Steps per min | Major Errors | Critical Errors (enter 0 or 24) | Adjusted Errors | Adjusted Steps per min (SPM) | Descriptions: error descriptions here |
|---|---|---|---|---|---|---|---|---|
| 3 | 44 | 41 | 35.1219512 | 0 | 0 | 0 | 35.121951 | |
| 3 | 47 | 44 | 32.7272727 | 0 | 0 | 0 | 32.727273 | |
| 3 | 38 | 35 | 41.1428571 | 0 | 0 | 0 | 41.142857 | |
| 3 | 44 | 41 | 35.1219512 | 0 | 0 | 0 | 35.121951 | |
| 3 | 40 | 37 | 38.9189189 | 0 | 0 | 0 | 38.918919 | |
| 3 | 42 | 39 | 36.9230769 | 1 | 0 | 2 | 33.846154 | 1 major error. stubs right foot when stepping down first white step. |
| 3 | 39 | 36 | 40 | 0 | 0 | 0 | 40 | |
| 3 | 44 | 41 | 35.1219512 | 0 | 0 | 0 | 35.121951 | |
| 3 | 43 | 40 | 36 | 0 | 0 | 0 | 36 | |
| 3 | 37 | 34 | 42.3529412 | 0 | 0 | 0 | 42.352941 | |
| 3 | 39 | 36 | 40 | 0 | 0 | 0 | 40 | |

LOW LUMINANCE MOBILITY TEST

RELATED APPLICATIONS

This application is a U.S. National Phase Application, filed under 35 U.S.C. § 371, of International Application No. PCT/US2022/014704, filed on Feb. 1, 2022, which claims priority to, and the benefit of, U.S. Provisional Application No. 63/145,228, filed on Feb. 3, 2021. The contents of each of the aforementioned patent applications are incorporated herein by reference in their entireties.

FIELD OF THE DISCLOSURE

The present disclosure is related to functional vision testing in a subject to (1) measure the level of visual impairment in cohorts cross-sectionally and longitudinally (2) with or without therapeutic interventions.

BACKGROUND

Mobility or maze testing in various forms has been used as a functional outcome measure and for at least one test variants as a US FDA accepted trial endpoint specifically in patients with inherited retinal dystrophies (IRDs), e.g., Leber congenital amaurosis type 2 with RPE 65 mutations but also other IRDs for a number of years. The use of mobility and maze testing in the broad retinitis pigmentosa (RP) has not yet been formally validated. Mobility as a functional task incorporates multiple vision functions including contrast sensitivity, visual fields, depth perception, and visual acuity. One particular maze navigation test, the multi luminance mobility test (MLMT), has been successfully used as a primary outcome measure during a recent clinical trial of gene therapy for patients with severe visual impairment in retinal degenerative disease (Leber congenital amaurosis type 2 with RPE 65 mutations). While some parameters of the prior tests have been validated, there has not been enough detail to replicate and test precisely, specifically for the most important determinants in an RP population, i.e., changes in contrast and illumination and the specific set up of the maze.

As no validated and regulatorily accepted mobility/maze tests exists for the broad spectrum of retinal dystrophies outside patients with RPE 65 mutations, there exists a significant unmet need for precisely measuring functional outcomes of subjects with degenerative retinal disease.

SUMMARY

The present disclosure provides systems and methods for testing functional vision in a subject. Generally, the subject is asked to navigate a preprinted pattern in a room lit with an intended illumination level.

In one aspect, the present disclosure provides a method of testing functional vision of a subject, the method comprising: (a) selecting a first course from a plurality of courses, each course having a grid of sections that comprises a beginning point, at least one turn, at least one obstacle, and an ending point, wherein: the grid of sections is pre-printed on an overall map for the subject; a plurality of the sections each includes a directional arrow, the directional arrows forming a path for the subject to walk on; at least one of the sections includes the at least one obstacle; and the at least one obstacle includes a physical object requiring avoidance, circumvention, traversal, and/or aversion; (b) selecting a first illumination level from 13 illumination levels, wherein: the 13 illumination levels range from about 0.12 lux to about 500 lux; and each illumination level is spaced from an adjacent illumination level by about 0.3 log units; (c) illuminating the first course with the first illumination level; (d) recording by video a first movement of the subject on the first course starting from the beginning point; and (e) determining a first step speed of the subject based on the first movement.

In some embodiments, the method further comprises: (f) selecting a second course from the plurality of courses, wherein the second course is different from the first course; (g) selecting a second illumination level from the 13 illumination levels, wherein the second illumination level is different from the first illumination level; (h) illuminating the second course with the second illumination level; (i) recording by video a second movement of the subject on the second course starting from the beginning point; (j) determining a second step speed of the subject based on the second movement; (k) producing a mobility curve showing the first and second step speeds as a function of the illumination level; and (l) determining a critical illumination level (CIL) for the subject based on the mobility curve, below which the subject's step speed decreases significantly.

In some embodiments, the method further comprises determining the subject's time to complete each course.

In some embodiments, the method further comprises determining a number of major errors when the subject completes each course, wherein each major error is selected from: a majority of a foot stepping into an area outside the path, skipping one directional arrow, moving the at least one obstacle by more than 4 inches, misjudging a height of the at least one obstacle, stepping into a solid black square by half a foot or more, and misjudging the end of the path but successfully completing the path.

In some embodiments, each step speed is calculated by the following formula: step speed=[(24−the number of major errors*2)*60]/the time to complete each course, wherein the time to complete the each course has a unit of seconds.

In some embodiments, when the subject commits a critical error, the step speed is zero, and wherein the critical error is selected from: skipping two or more sections on the path, getting lost for at least five seconds, and misjudging heights of all three in-path raised obstacles.

In some embodiments, the subject has normal functional vision.

In some embodiments, the subject is suspected of having vision impairment or deficiency in one or both eyes based on other functional assessments, e.g., visual acuity.

In some embodiments, the subject is a candidate for local or systemic ophthalmic treatment.

In some embodiments, the local or systemic ophthalmic treatment is ocular therapy, surgery, gene therapy, or a combination thereof, for one or both eyes.

In some embodiments, the ocular therapy, surgery, or the gene therapy is for treatment of retinitis pigmentosa (RP), Leber's congenital amaurosis (LCA), Stargardt disease, Usher's syndrome, choroideremia, a rod-cone or cone-rod dystrophy, a ciliopathy, a mitochondrial disorder, progressive retinal atrophy, a degenerative retinal disease, age related macular degeneration (AMD), wet AMD, dry AMD, geographic atrophy, a familial or acquired maculopathy, a retinal photoreceptor disease, a retinal pigment epithelial-based disease, diabetic retinopathy, cystoid macular edema, uveitis, retinal detachment, traumatic retinal injury, iatrogenic retinal injury, macular holes, macular telangiectasia, a ganglion cell disease, an optic nerve cell disease, glaucoma, optic neuropathy, ischemic retinal disease, retinopathy of prematurity, retinal vascular occlusion, familial macroaneurysm, a retinal vascular disease, an ocular vascular diseases, a vascular disease, or ischemic optic neuropathy.

In some embodiments, the method is performed prior to the subject undergoing systemic or local ophthalmic treatment, e.g., ocular therapy, surgery, and/or gene therapy.

In some embodiments, the method is performed during the subject undergoing systemic or local ophthalmic treatment, e.g., ocular therapy, surgery, and/or gene therapy.

In some embodiments, the method is performed after the subject has undergone systemic or local ophthalmic treatment, e.g., ocular therapy, surgery, and/or gene therapy.

In some embodiments, the method is repeated over a recovery period of the subject to monitor improvement or decline associated with systemic or local ophthalmic treatment, e.g., ocular therapy, surgery, and/or gene therapy.

In some embodiments, each course comprises one to about 15 turns.

In some embodiments, each course comprises seven to nine turns.

In some embodiments, each course comprises one to about 15 obstacles.

In some embodiments, the at least one obstacle is selected from: an object placed in the path, an object placed adjacent to the path, a raised section, a section having a color indicative of obstacle, and an edge of a step.

In some embodiments, each course consists of three obstacles in the path and seven obstacles adjacent to the path.

In some embodiments, the path for each course consists of 22 to 24 sections.

In some embodiments, the plurality of courses includes at least 12 courses.

In some embodiments, the method further comprises: instructing a first human grader and a second human grader to view each video, wherein each grader determines the time to complete each course, the number of major errors when the subject completes each course, and each step speed; comparing the step speed determined by the first grader and the step speed determined by the second grader; and averaging the step speeds determined by the first and second graders if the time to complete each course differs by no more than five seconds by the first and second graders. In some embodiments, the CIL for a subject with normal functional vision is about 0.12 lux.

In some embodiments, the method further comprises determining a maximum step speed (MSS) for the subject, wherein the MSS is an average of the step speeds determined for the illumination levels at or above the CIL.

In some embodiments, the MSS for a subject with normal functional vision is about 61 steps per minute (spm).

In some embodiments, wherein when the CIL of the subject is no more than one lux, the method further comprising selecting a course with a Weber contrast value of about 10% to about 50%.

In some embodiments, the Weber contrast value is about 10%, about 25%, about 30%, or about 50%.

In one aspect, the present disclosure provides a method of testing functional vision of a subject, the method comprising: (a) selecting a first course from a plurality of courses, each course having a grid of sections that comprises a beginning point, at least one turn, at least one obstacle, and an ending point, wherein: the grid of sections is pre-printed on an overall map for the subject; a plurality of the sections each includes a directional arrow, the directional arrows forming a path for the subject to walk on; at least one of the sections includes the at least one obstacle; and the at least one obstacle includes a physical object requiring avoidance, circumvention, traversal, and/or aversion; (b) selecting a first illumination level from a plurality of illumination levels; (c) illuminating the first course with the first illumination level; (d) recording by video a first movement of the subject on the first course starting from the beginning point; (e) determining a first step speed of the subject based on the first movement; (f) selecting a second course from the plurality of courses, wherein the second course is different from the first course; (g) selecting a second illumination level from the plurality of illumination levels, wherein the second illumination level is different from the first illumination level; (h) illuminating the second course with the second illumination level; (i) recording by video a second movement of the subject on the second course starting from the beginning point; (j) determining a second step speed of the subject based on the second movement; (k) producing a mobility curve showing the first and second step speeds as a function of the illumination level; and (l) determining a critical illumination level (CIL) for the subject based on the mobility curve, below which the subject's step speed decreases significantly.

In some embodiments, the plurality of courses is characterized by a plurality of Weber contrast values.

In some embodiments, when the CIL of the subject is no more than one lux, the method further comprising selecting a course with a Weber contrast value of about 10% to about 50%.

In one aspect, the present disclosure provides a system for testing functional vision of a subject, the system comprising: (a) a plurality of courses configured to facilitate performing the test, each course having a grid of sections that comprises a beginning point, at least one turn, at least one obstacle, and an ending point, wherein: the grid of sections is pre-printed on an overall map for the subject; a plurality of the sections each includes a directional arrow, the directional arrows forming a path for the subject to walk on; at least one of the sections includes the at least one obstacle; and the at least one obstacle includes a physical object requiring avoidance, circumvention, traversal, and/or aversion; (b) a plurality of lights configured to control an illumination level; (c) a light meter configured to determine the illumination level; (d) a video-recording device configured to record a movement of the subject as the subject walks on the path; and (e) a computing process configured to determine a critical illumination level (CIL) for the subject, below which the subject's step speed decreases significantly.

In one aspect, the present disclosure provides a method of monitoring the progress of a subject that is undergoing or has received local or systemic ocular treatment, the method comprising: (a) determining a first CIL of the subject using the method described above at a first time point; (b) determining a second CIL of the subject using the method described above at a second time point, the second time point being later than the first time point; (c) comparing the first CIL with the second CIL; and (d) determining that the subject is: (i) making progress if the second CIL is significantly less than the first CIL, or (ii) not making progress or becoming more visually impaired if the second CIL is the same as or greater than the first CIL.

In one aspect, the present disclosure provides a method of monitoring the progress of a subject that is undergoing or has received local or systemic ophthalmic treatment, the method comprising: (a) determining a first MSS of the subject using the method described above at a first time point; (b) determining a second MSS of the subject using the method described above at a second time point, the second time point being later than the first time point; (c) comparing the first MSS with the second MSS; and (d) determining that the subject is: (i) making progress if the second MSS is significantly greater than the first MSS, or (ii) not making progress or becoming more visually impaired if the second MSS is the same as or lower than the first MSS.

In some embodiments of the methods and systems described herein, the subject is human.

BRIEF DESCRIPTION OF THE FIGURES

FIG. 15 depicts the grading worksheet of a validation study subject with average time trials of approximately 40 seconds and corresponding step speeds of 32 and 42 steps per minute (SPM).

DETAILED DESCRIPTION

Definitions

Figure 1A:
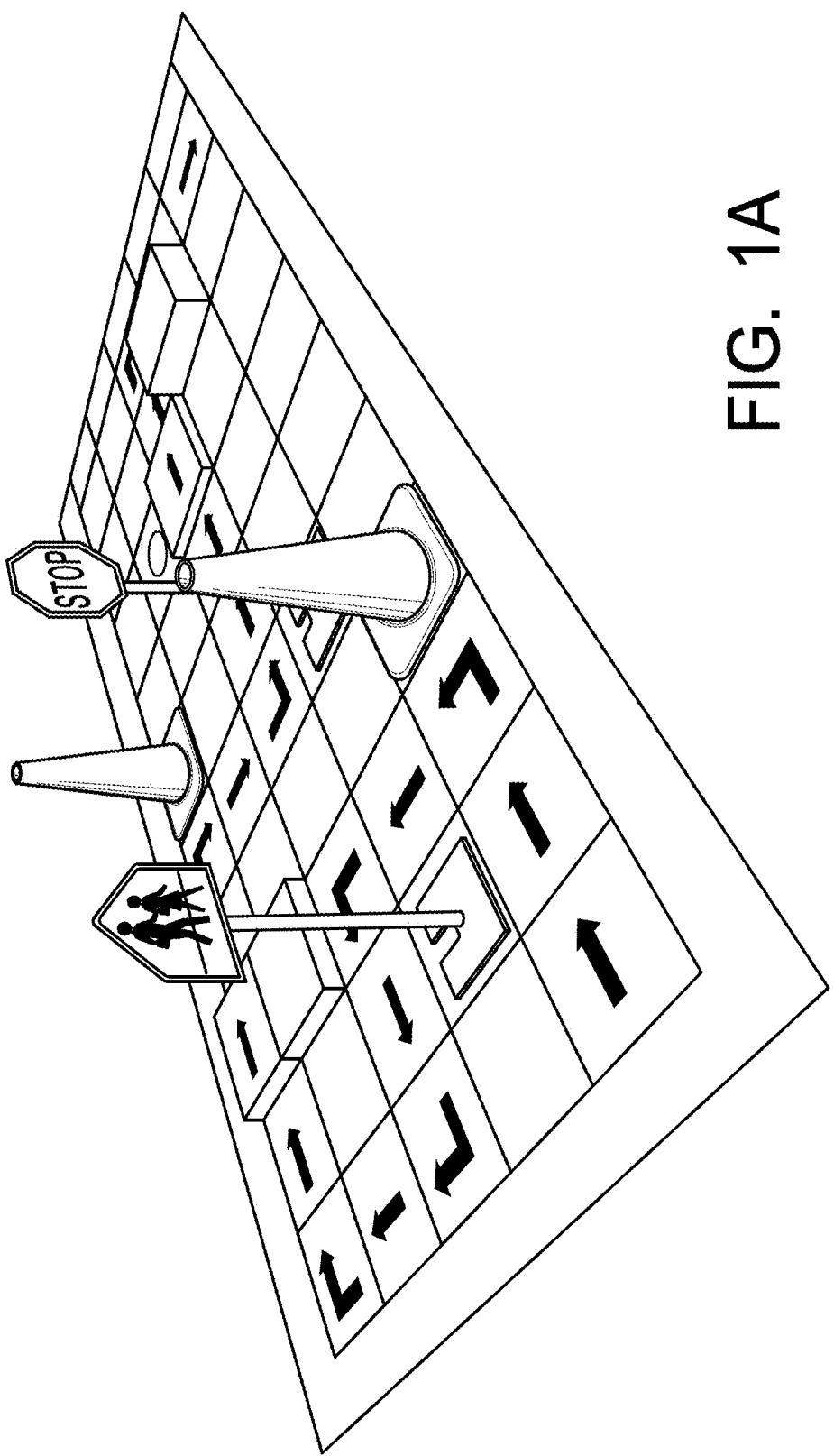
FIG. 1A depicts a high contrast arrow pattern of the mobility test, high contrast obstacles, lighting and room set-up.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The terms "substantially," "approximately," and "about" used throughout this Specification and the claims generally mean plus or minus 10% of the value stated, e.g., about 100 would include 90 to 110.

As used herein, the terms "illumination level" and "light level" are used interchangeably.

As used herein, the term "significantly" refers to means statistically different using descriptive statistics, wherein the difference is subject to any statistical analysis with a p value of less than 0.05, preferably less than 0.01, more preferably less than 0.001. In some embodiments, the term "significantly" means two standard deviations below the mean of the plateau of a curve.

As used herein, the term "maximum step speed," abbreviated as MSS, refers to the average fastest and repeatable stepping speed based on the step speeds at or above the CIL of a subject.

As used herein, the terms "completing the path" and "completing the course" are used interchangeably.

Functional vision can be described as how a person functions or performs in a vision-related activity. Such activities include reading, orientation, mobility and navigation, and visual communication and visual occupational abilities. Functional vision is therefore a behavioral consequence of visual function. Changes in functional vision (e.g., vision improvement, correction, rehabilitation, etc.) can be ascertained by objective performance of a controlled task requiring vision. Task performance may be scored based upon timing and error rate. Patient reported outcomes are a measure of changes in daily activities or patient symptoms as reflected, for example, by performance of routine day-to-day tasks requiring vision or severity of vision impairment.

Utilizing maze patterns and obstacles, MLMT has been used to assess functional vision in patients with inherited retinal dystrophies. For example, see Chung et al., "Novel mobility test to assess functional vision in patients with inherited retinal dystrophies," Clin. Exp. Ophthalmol. 2018, 46, 247-259; see also U.S. Pat. No. 10,448,823. MLMT has drawbacks, including a limited number of light levels, uneven differences in lighting levels from high to low, and a grading process that measures absolute pass/fail performance which may be an inconsistent measure of functional vision. In addition, when MLMT is administered, the "fail" zone can be very challenging for the patients as they may stumble around in an illumination level too low for them, leading to frustration which is known to meaningfully impact further test performance of a subject and a potential variance in grading. All of the characteristics of the MLMT mentioned above cause either meaningful limitations of the target patient groups or disease that can be assessed due to ceiling effects of the measurement or the assessments are inaccurate or significantly more variable.

The present disclosure provides an improved mobility test as compared to MLMT. The mobility test described herein and MLMT differ in one or more of the following aspects: the expansion of the light levels into much lower lux, an even distribution of light levels of about 0.3 log unit steps, and a more reliable and objective scoring algorithm that measures low light mobility function for a very broad range of disease severity. In some embodiments, the mobility test described herein include low contrast versions to expand test sensitivity.

In one aspect, the present disclosure provides a system for testing functional vision of a subject, the system comprising: (a) a plurality of courses configured to facilitate performing the test; (b) a plurality of lights configured to control an illumination level; (c) a light meter configured to determine the illumination level; (d) a video-recording device configured to record a movement of the subject as the subject walks on the path; and (e) a computing process configured to determine a critical illumination level (CIL) for the subject, below which the subject's step speed decreases significantly. CIL is the light level at which lower light levels would cause the subject to drop in function by a significant amount. In some embodiments, CIL is the light level at which lower light levels would cause the subject to drop in the step speed by at least about 10%, at least about 15%, at least about 20%, at least about 25%, at least about 30%, at least about 35%, at least about 40%, at least about 45%, or at least about 50%.

In some embodiments, the computing process is further configured to determine a maximum step speed (MSS) for the subject. The computing process can be performed on a computing device.

The course can be used in a single assessment facility or courses with identical setup can be used in a multi-center setting.

Each course is predefined. In some embodiments, each course has a grid of sections that comprises a beginning point, at least one turn, at least one obstacle, and an ending point, wherein: the grid of sections is pre-printed on an overall map for the subject; a plurality of the sections each includes a directional arrow, the directional arrows forming a path for the subject to walk on; at least one of the sections includes the at least one obstacle; and the at least one obstacle includes a physical object requiring avoidance, circumvention, traversal, and/or aversion.

In some embodiments, the plurality of courses can have a variety of contrast levels.

Under a pre-determined illumination level, a subject navigating each course will be instructed to start at the beginning point, follow the arrows, avoid any obstacles, and exit the course from the ending point.

In some embodiments, each course comprises one to about 15 turns, e.g., three to 15 turns, five to 12 turns, five to ten turns, or seven to nine turns. In some embodiments, each course comprises seven to nine turns.

The obstacles permit a grader to gauge how well the subject recognizes them. In some embodiments, each course can comprise one to about 15 obstacles. For example, each course can comprise eight obstacles, nine obstacles, ten obstacles, 11 obstacles, or 12 obstacles. Each obstacle can be selected from: an object placed in the path, an object placed adjacent to the path, a raised section ("in-path raised obstacle"), a section having a color indicative of obstacle (e.g., a solid black section), and an edge of a step. In some embodiments, each course can consist of three obstacles in the path and seven obstacles adjacent to the path.

The obstacles adjacent to the path can be pre-printed on each course so as to avoid bias by an examiner.

The obstacles in the path can be placed on the course by an examiner prior to the start of the trial when the subject's eyes are covered or closed (so the subject does not see the configuration prior to the start). In some embodiments, the obstacle in the path can be selected from a one-inch high step, a triangle step-over obstacle, and a two-inch high step. Generally, the obstacle in the path is placed on a linear segment of the path having at least four directional arrows. In addition, the obstacle in the path should not be placed right after a corner arrow so the subject has time to find their straightaway path and possibly see the next obstacle. For example, a low-step obstacle (e.g., a one-inch high step) can be placed on the third arrow in a linear segment of five or more arrows; a triangle step-over obstacle can be placed on the third arrow in a linear segment of four or more arrows; and a higher-step obstacle (e.g., a two-inch high step) can be placed on the third or fourth arrow in a linear segment of six or more arrows.

While each course has at least one distinguishing feature from the other courses, all the courses can have the same three obstacles placed in the paths under different configurations. This expectation of the same features for every course can be important for repeatability and consistency of testing. Different configurations are used to avoid memorization.

In some embodiments, the path of each course can have two or three linear segments, each segment having four or more arrows. These long linear segment permits the subject to have time to find any obstacle on the segment with their limited vision.

In some embodiments, each path can have 22 to 24 arrows, e.g., 22 arrows, 23 arrows, or 24 arrows.

In some embodiments, the plurality of courses includes at least 12 courses, at least 13 courses, at least 14 courses, at least 15 courses, at least 16 courses, at least 17 courses, at least 18 courses, at least 19 courses, or at least 20 courses.

Figure 1B:
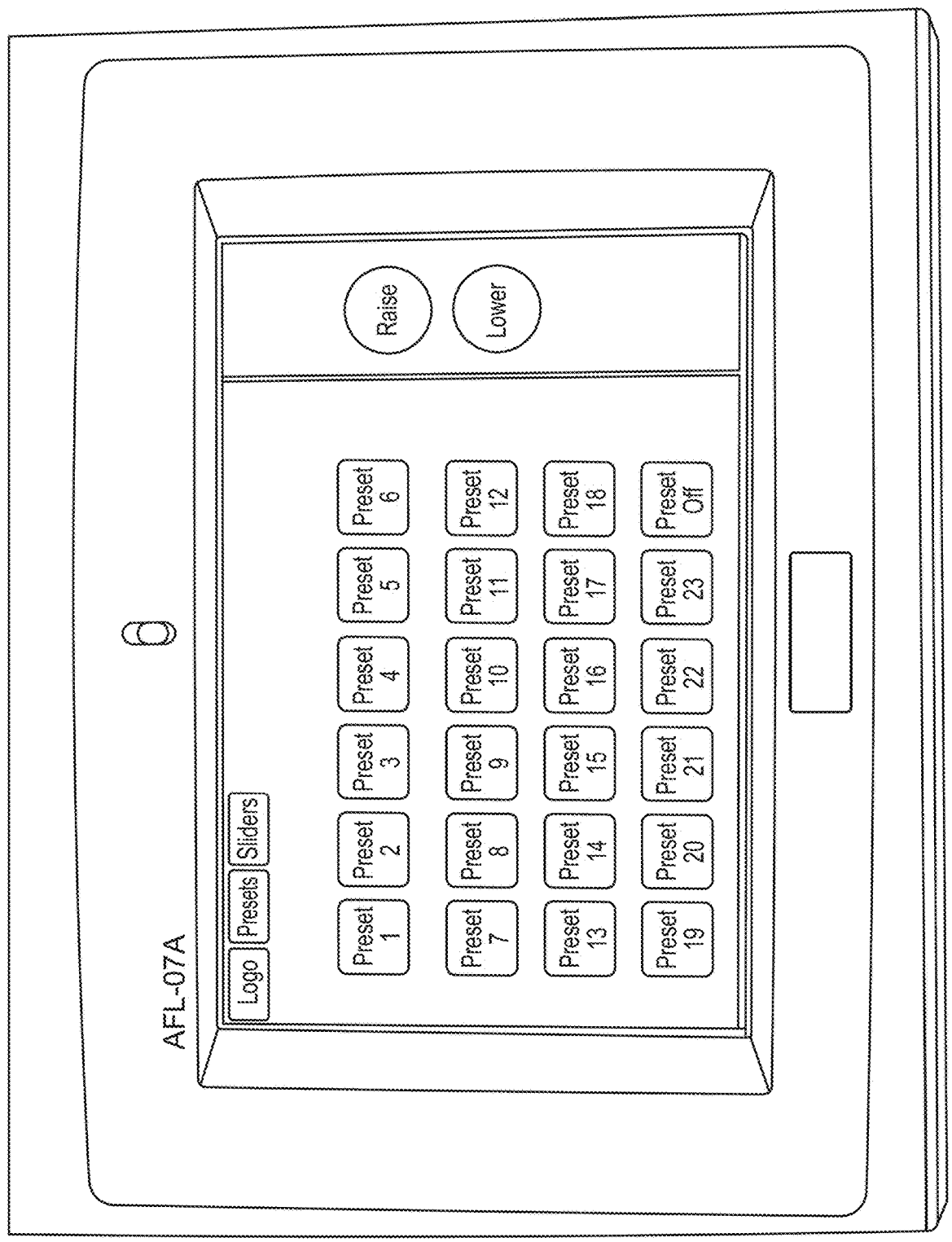
FIG. 1B depicts the computer panel that controls the lighting.

In some embodiments, the plurality of lights can comprise light-emitting diodes (LEDs). For example, the plurality of lights can comprise eight theater-type LED panel lights. The illumination level can be controlled with large LED panels providing indirect lighting, e.g., by LED panels directed at the ceiling for indirect reflection that eliminates shadows. Each panel can be programmed for consistent color and brightness using a computer program (e.g., see FIG. 1B). Each illumination level can be confirmed with a light meter placed at at least three locations on the maze pattern to confirm lighting is within 10% of the expected level and consistent across the room. The testing can be performed by staff trained in low vision assessments, e.g., optometrists, in an environment where testing factors can be controlled to produce a functional assessment.

In some embodiments, the plurality of lights comprises six or more panels of LEDs utilizing a broad spectrum of wavelengths.

The plurality of lights can be spaced around the edge of the course to create uniform illumination as confirmed by repeated light-meter measurements over time.

In some embodiments, the plurality of lights is interfaced with a computer and each light level comprised of an even distribution of color temperature and illumination is programmed with an established preset setting.

In some embodiments, the plurality of lights is programmed in each setting with even increments of 0.3 log steps higher or lower than the previous setting.

In some embodiments, the light settings have 13 or more unique increments covering lighting range from an extremely dim room to a bright indoor office.

In some embodiments, the plurality of lights in the form of LED panels with metal flanges on each side are individually positioned with flanges partially open in some cases or more widely open in others and then panels are carefully aimed at the upper wall area and ceiling to produce indirect and evenly distributed reflected lighting to thereby reduce or eliminate shadows on the course.

In some embodiments, each illuminance level during every test trial is checked in a minimum of three locations using a light meter placed on the surface of the course.

Each illumination level represents a change in illumination of 0.3 log units or half the prior illumination level in lux (factor of 2). The 0.3 log level is chosen to be analogous to clinically meaningful visual acuity changes (e.g., 3 lines of acuity or 0.3 log MAR, which is a conservative estimation of clinically meaningful change), as well as in practically creating a noticeable lighting change. There can be 13 levels of light that can be used in the test ranging from 0.12 lux to 500 lux.

The determination of the CIL is described in greater detail in the methods below.

The present disclosure provides a method of testing functional vision of a subject, the method comprising: (a) selecting a first course from the plurality of courses as described above; (b) selecting a first illumination level from 13 illumination levels, wherein: the 13 illumination levels range from about 0.12 lux to about 500 lux; and each illumination level is spaced from an adjacent illumination level by about 0.3 log units; (c) illuminating the first course with the first illumination level; (d) recording by video a first movement of the subject on the first course starting from the beginning point; and (e) determining a first step speed of the subject based on the first movement.

The first course can be selected randomly from the plurality of courses. In some embodiments, a practice session can be conducted on the subject to select the first illumination level. During the practice session, a high illumination level without causing glare discomfort (e.g., about 250 lux) and a course are used, rules for navigating the courses are introduced, and the time to complete the course is measured. Then, one or more lower illumination levels are introduced. The subject describes the illumination level where it starts to get difficult, and may do a few steps in the lower levels to test out ability (e.g., estimating a preliminary CIL). Then a level is selected where the subject can still navigate at their faster speeds just above the preliminary CIL, a new course is used, and this is videotaped and conducted exactly like the testing would be done and it is recorded on the sheet with a "p" for practice. The subject is dark adapted for approximately 20-30 minutes and then testing begins below the preliminary CIL by about two to three light levels. Further, the testing starts in the low light levels and the light level gradually increases. It may be that the first low dark level is a fail level (i.e., a level when the subject commits a critical error), although the subject is not required to fail as a starting trial. The requirement is that the starting light level (i.e., the first illumination level) is at least two light levels lower than the preliminary CIL and the subject is significantly slower than the step speed recorded at the preliminary CIL (e.g., >5 seconds slower). The light level is then increased and each trial is executed using a different course configuration. This process continues until at least three trials are conducted with the time to complete each course all within a five second range. Sometimes the subject may gain confidence with repeated trials at higher illumination levels (above their CIL) and gradually increase speed. If this occurs, the trials close to the preliminary CIL should be re-tested to ensure that illumination level is the only factor slowing performance.

Accordingly, in some embodiments, the method further comprises: (f) selecting a second course from the plurality of courses, wherein the second course is different from the first course; (g) selecting a second illumination level from the 13 illumination levels, wherein the second illumination level is different from the first illumination level; (h) illuminating the second course with the second illumination level; (i) recording by video a second movement of the subject on the second course starting from the beginning point; and (j) determining a second step speed of the subject based on the second movement.

In some embodiments, the second illumination level is lower than the first illumination level. In some embodiments, the second illumination level is higher than the first illumination level. The subject can be tested on any additional number of courses necessary to produce a mobility curve that shows the step speed as a function of the illumination level. For example, the subject may be tested on four to eight courses, e.g., three courses, four courses, five courses, six courses, seven courses, or eight courses.

Video recordings are sent off to one or more graders for their masked grading process. The graders will determine: (a) the time for the subject to complete each course, (b) the number of major errors when the subject completes each course, (c) whether the subject commits a critical error, and/or (d) the step speed for each course.

In some embodiments, each major error is selected from: a majority of a foot stepping into an area outside the path, skipping one directional arrow, moving the at least one obstacle by more than four inches, misjudging a height of the at least one obstacle, stepping into a solid black square by half a foot or more (because solid black squares are not part of the path), and misjudging the end of the path but successfully completing the path. In some embodiments, the subject misjudges the height of an obstacle when the subject trips over the obstacle or that the subject raises their foot too high for the obstacle.

Each step speed can be calculated by the following formula: step speed=[(24-the number of major errors*2)*60]/the time to complete each course, wherein the time to complete the each course has a unit of seconds. When there are two or more graders, the method further comprises comparing the step speed determined by the first grader and the step speed determined by the second grader, and averaging the step speeds determined by the first and second graders if the time to complete each course differs by no more than five seconds by the first and second graders.

When the subject commits a critical error, the step speed is zero. In some embodiments, the critical error is selected from: skipping two or more sections on the path, getting lost for at least five seconds, and misjudging the height of all three in-path raised obstacles. In some embodiments, the subject is getting lost when the subject stays on a section and does not appear to be sure what their next step is.

The mobility curve is then drawn showing the step speeds as a function of the illumination level. Based on the mobility curve, the method further comprises determining a CIL for the subject, below which the subject's step speed decreases significantly by two standard deviations (SD) from the average step speed of the trials performed at or above the CIL (or 2 SD from the MSS). This plateau is where the subject has fairly consistent performance; the trials below the performance threshold is where subjects noticeably slow and make more errors. The mobility curve can also be used to calculate the MSS for the subject. In some embodiments, the CIL and MSS for a subject with normal functional vision is about 0.12 lux and 61 steps per minute respectively when performed initially in the high contrast course. 0.12 lux is the lowest practically usable light level. While less than 0.12 lux is technically possible, it would make no difference medically. As such, the CIL for a subject with normal functional vision is set at about 0.12 lux.

In some embodiments, the determination of CIL and/or MSS is based on a scoring algorithm programmed in R computing language originally designed for a functional reading test, the MNREAD, but revised for the mobility test described herein. The revised and programmed scoring algorithm produces a mobility curve, from which the CIL and MSS are derived.

Testing in the low contrast setting could be added to explore even better performance in the mobility test. When the mobility curve is plotted, the CIL is the last point on the plateau before the next drop in function. In contrast, MLMT determines a sub threshold (fail) light level and a super threshold (pass) light level. It has been discovered that testing subjects in their sub-threshold or fail range is very challenging and emotionally upsetting to patients (also negatively impacting further testing on the same day or follow-on assessments) and quite variable as they may gain in confidence. As shown in the validation studies in the Example section, the testing method disclosed herein where most of it is in the subject's super threshold range is more consistent. The CIL approach a priori limits variable impact of personal traits like anxiety or risk-taking behavior, which is for adults who have a lifetime of anxiety from reduced mobility with RP considered an enormous improvement in respect to limiting confounders. Also outliers by demotivation of subjects due to fail are limited.

The system and method of the present disclosure can be used to monitor the progress of a subject that is undergoing or has received local or systemic ophthalmic treatment, e.g., ocular therapy, surgery, and/or gene therapy for one or both eyes. In some embodiments, the monitoring method comprises: (a) determining a first CIL of the subject using the method described herein at a first time point; (b) determining a second CIL of the subject using the method described herein at a second time point, the second time point being later than the first time point; (c) comparing the first CIL with the second CIL; and (d) determining that the subject is: (i) making progress if the second CIL is significantly less than the first CIL, or (ii) not making progress or becoming more visually impaired if the second CIL is the same as or greater than the first CIL.

In some embodiments, the subject has normal functional vision. In some embodiments, the subject is suspected of having vision impairment or deficiency in one or both eyes. In some embodiments, the subject has a retinal or ocular disease that impacts the photoreceptors in one or both eyes. In some embodiments, the subject is a candidate for local or systemic ophthalmic treatment, e.g., ocular therapy, surgery, gene therapy, or a combination thereof, for one or both eyes. The ocular therapy, surgery, or the gene therapy can be for treatment of retinitis pigmentosa (RP), Leber's congenital amaurosis (LCA), Stargardt disease, Usher's syndrome, choroideremia, a rod-cone or cone-rod dystrophy, a ciliopathy, a mitochondrial disorder, progressive retinal atrophy, a degenerative retinal disease, age related macular degeneration (AMD), wet AMD, dry AMD, geographic atrophy, a familial or acquired maculopathy, a retinal photoreceptor disease, a retinal pigment epithelial-based disease, diabetic retinopathy, cystoid macular edema, uveitis, retinal detachment, traumatic retinal injury, iatrogenic retinal injury, macular holes, macular telangiectasia, a ganglion cell disease, an optic nerve cell disease, glaucoma, optic neuropathy, ischemic retinal disease, retinopathy of prematurity, retinal vascular occlusion, familial macroaneurysm, a retinal vascular disease, an ocular vascular diseases, a vascular disease, or ischemic optic neuropathy.

In some embodiments, the method is performed prior to the subject undergoing the ophthalmic treatment, e.g., ocular therapy, surgery, and/or gene therapy. In some embodiments, the method is performed during the subject undergoing the ocular therapy, surgery, and/or gene therapy. In some embodiments, the method is performed after the subject has undergone the ocular therapy, surgery, and/or gene therapy. In some embodiments, the method is repeated over a recovery period of the subject to monitor improvement or decline associated with the ocular therapy, surgery, and/or gene therapy. In some embodiments, the subject is a human.

The method described herein can be modified to test a subject with a less severe ocular or retinal disease, e.g., a subject having a CIL of one lux or less. For example, during preliminary trials, a subject's CIL is determined to be one lux or less, then the subject is asked to navigate one or more course with a low Weber contrast value of about 10% to about 50%. In some embodiments, the Weber contrast value is about 10%, about 15%, about 20%, about 25%, about 30%, about 35%, about 40%, about 45%, or about 50%.

Use of the low contrast version is considered to remove ceiling effects in testing, when initial exploratory testing in either or both eyes reveals near-normal performance on the high contrast version.

In some embodiments, if the CIL at initial testing with the high contrast version is estimated to be 1 lux or lower, the 10% or 25% version is introduced. If the 10% version can be performed at any light level, it is selected and testing is continued with the 10% contrast version over time. Use of the 25% contrast version can be considered for patients with a performance level between high contrast and 10%.

In some embodiments, different versions (e.g., 10% and high contrast) could be used to assess function in each eye.

In some embodiments, if the 10% version cannot be completed reliably at any level, the 25% contrast version is used at baseline and at all following visits.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

EXAMPLES

Abbreviations:

| | |
|---|---|
| BCVA | best corrected visual acuity |
| CIL | critical illumination level |
| CS | contrast sensitivity |
| G | grader |
| LOA | limits of agreement |
| LV | Low vision |
| MAR | Minimum angle of resolution |
| MLMT | multi luminance mobility test |
| MNREAD | Minnesota Low Vision Reading Test |
| MSS | maximum step speed |
| RP | retinitis pigmentosa |
| SD | standard deviation |
| SPM | steps per minute |
| VA | visual ability |
| VF | visual field |
| VFQ | visual functioning questionnaire |
| VN | visually normal |

Example 1. Low Luminance Mobility Test (LLMT)

Mobility Test Design

As part of an ongoing program to develop more refined clinical endpoints better targeted for RP patients and acceptable for the conduct of informative clinical trials with a registration intent, JCyte has developed a unique low luminance/low contrast mobility test, the LLMT aimed at assessing subjects with a wide range of vision loss. In addition to maze patterns, standardization of obstacles, independent and masked graders, and video capture of trials, the LLMT has 13 light levels (0.12 to 500 lux) and a novel and robust scoring paradigm, according to some embodiments.

Design modifications were intended to improve the assessment over the broad range of function in the RP population studied (not limited to specific genotypes): (1) extension of the range of the light levels with additional low luminance levels to reduce a potential ceiling effect, (2) creation of even increments between each light level of 0.3 log units (by factor of 2), (3) creation of a more objective scoring and precise algorithm compared to the MLMT described by Chung et al., 2018, and (4) and increased sensitivity in less severely impaired subjects by introducing low contrast arrow patterns of 10 and 25%.

The LLMT requires custom lighting, specialized videography, and independent trained graders. Due to the need for very specific equipment, dedicated space, and consistency in testing, mobility testing was established at a centralized testing facility, separate from the clinical study sites (see FIG. 1A). The conditions set up there, are standardized and can be setup at other similar test facility to allow multi-center testing. There are 12 arrow patterns with variation in directions of the arrows to remove memorization capability. In addition, subjects use special socks with rubber grips are used to maintain footwear consistency. Lighting is controlled with a minimum of six large LED panels directed at the ceiling for indirect reflection that eliminates shadows. Each panel has moveable flanges that have been carefully set to create even illumination across the maze pattern and then each light level has been programmed for consistent color and brightness using a computer (see FIG. 1B). The lighting positions, the flanges, and the distribution of light (colors and brightness) of each panel for each light level can be flexibly adapted which in practice is rarely needed as the specific setup of the lighting of the LLMT is fairly robust and consistent. Each level is confirmed with a light meter placed at three locations on the maze pattern to confirm lighting is within 10% of the expected level and consistent across the room, the lighting is extremely consistent and has rarely required resetting and usually only in the event of a dislodged light panel from cleaning or other similar incident. The testing is performed by staff trained in low vision assessments, e.g., optometrists, in an environment where factors of specific lighting using the LED panels in the configuration specified, the use of 12 specific mobility patterns, optional use of low contrast versions, and using the scoring algorithm are used to produce a reliable and functional assessment.

Each lighting level represents a change in illumination of 0.3 log units or half the prior illumination level in lux (factor of 2). The 0.3 log level was chosen to be analogous to clinically meaningful visual acuity changes (e.g., 3 lines of acuity or 0.3 log MAR), as well as in practically creating a noticeable lighting change. There are 13 levels of light that can be used in the test ranging from 0.12 lux to 500 lux and corresponding scale scores for simple statistical analysis ranging from −1 to 13, room lights off (see Table 1 below). Also shown in Table 1 is the comparison with the MLMT light levels and increments between each level (approximated from Chung et al, 2018). Change over time is primarily represented using CIL scores on this scale but can also be determined by MSS as a secondary or complementary measure.

TABLE 1

Comparison of MLMT and LLMT scale scores* - Examples of practical lighting situations are identified at the top of the table for ranges of lux levels. Conversion to scale score per lux level is identified for each test.

| | Bedroom with crack of light Moonless night | | | Hotel room with lamp Bedroom with TV | | | Bathroom stall; home hallway | | Restaurant Bowling Alley | Bathroom | Indoor office | | |
|---|---|---|---|---|---|---|---|---|---|---|---|---|---|
| MLMT Lux Levels | | | | 1 | | 4 | 10 | | 50 | 125 | 250 | 500 | Can't Pass |
| MLMT Scale | | | | 6 | | 5 | 4 | | 3 | 2 | 1 | 0 | −1 |
| LLMT Lux Levels | Light off | 0.12 | 0.25 | 0.5 | 1 | 2 | 4 | 8 | 16 | 32 | 63 | 125 | 250 | 500 | Can't Pass |
| LLMT Scale | 13 | 12 | 11 | 10 | 9 | 8 | 7 | 6 | 5 | 4 | 3 | 2 | 1 | 0 | −1 |

* MLMT light levels estimated from Chung et al, 2018.

These data show that the LLMT design has a broad and even increment range of lighting levels and a scoring algorithm (see below) that identifies the light level corresponding to the initial significant drop in mobility performance (CIL) as well as the average step speed (MSS) above the CIL.

LLMT Scoring

Testing is aimed at capturing functional performance at a range of light levels at each visit through a series of trials (video-taped) for each subject. A curve is plotted that captures subject adjusted step speeds, which includes speed and accuracy over a range of light levels. There is no pre-established fail time limit as the subjects vary considerably in age and balance ability. Each subject is compared to their own baseline pre-intervention performance. Safety is managed carefully as patients of older ages and restricted fields often have balance difficulties. Subjects are instructed to stop testing at any time they feel unsafe with the steps or raised obstacles in each maze as lighting is dimmed.

Figure 2:
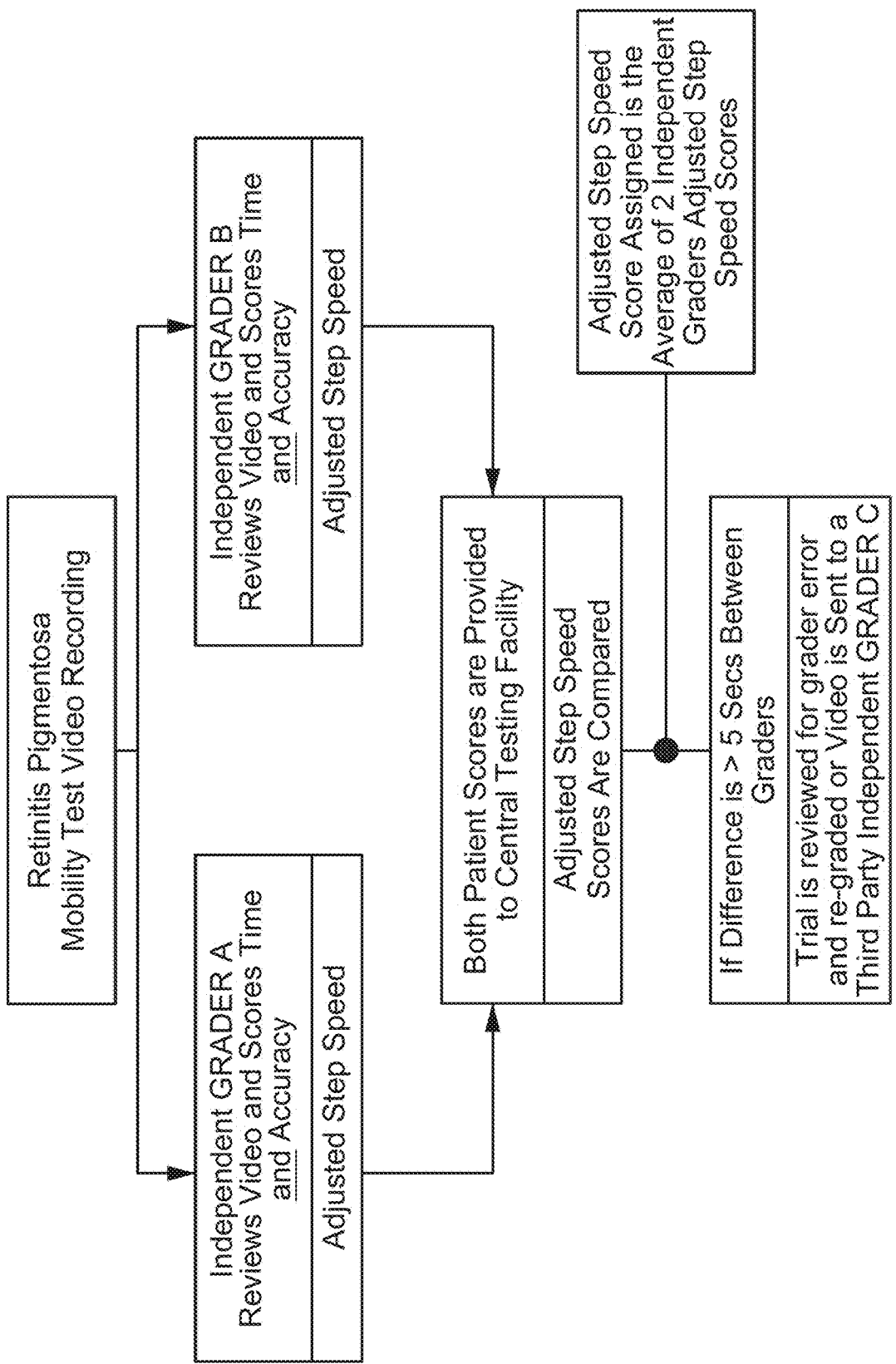
FIG. 2 depicts a flowchart that describes the grading process for subjects that are administered to the mobility test of the present disclosure. In case of disagreements of first and second grader, an adjudication process is in place.
Figure 3:
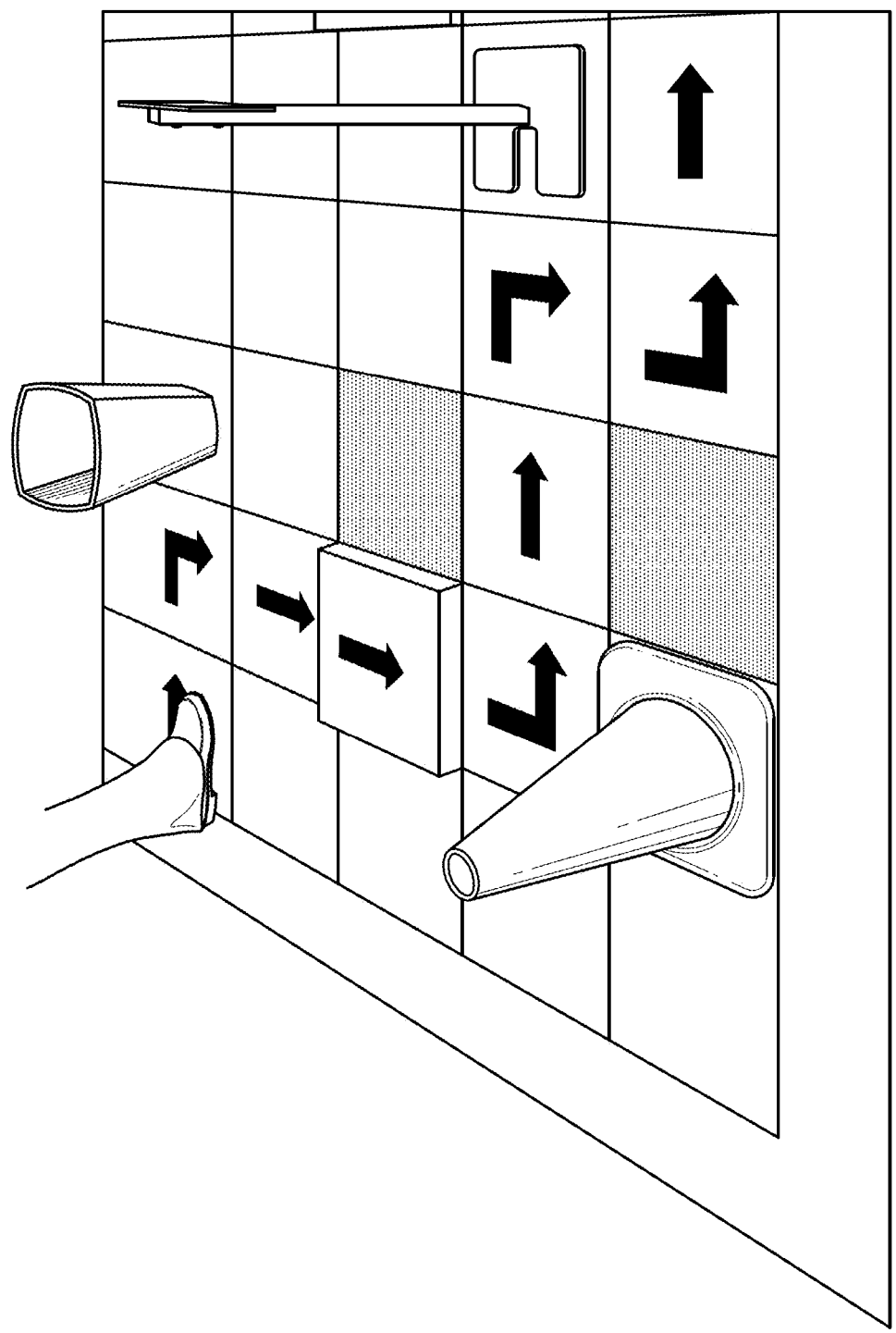
FIG. 3 depicts the view of a video trial from the perspective of a grader.

Two independent trained graders with certification as orientation and mobility specialists remotely review trial videos using a standardized rubric to evaluate time and errors for each illumination level that is tested. A third trained grader is used in cases of a grading discrepancy; results requiring any adjudication are reviewed by a supervisor, who determines whether a trial should be re-reviewed by the original grader (e.g., typos, obvious misses of errors) or whether it is a challenging subject performance that would benefit from a third review (see FIG. 2). The graders are masked to the treatment assignment, to the illumination level, and to the time point of assessment (e.g., prior to treatment, or time post-treatment) (FIG. 3). Video trials are masked to lighting level by adjusting camera ISO settings for each trial so each downloaded black and white video appears similar in brightness. A printed grid outlining the specific ISO settings per lighting level is posted in the testing room to guide examiners in efficient trial preparation.

The graders measure time to complete the maze and tabulate the errors as either major or critical based on a rubric. Error definitions are categorized as major (e.g., most of the foot stepped into an area outside of the directed path, obstacle bumped and moved, misjudged height of an obstacle), or critical (e.g., skipped one or more path squares, lost on track for five or more seconds, misjudged height of 3/3 in-path raised obstacles). Graders tabulate errors and time on a scoring spreadsheet that has a formula (maze algorithm) that automatically adjusts the time score based on time penalty for type of error, as shown in equation 1.

$$\text{adjusted step speed (minutes)} = \frac{[24 - (\text{major errors} * 2)] * 60}{\text{time to complete test (seconds)}} \qquad \text{Equation 1}$$

The adjusted time in steps per minute (SPM) is assigned to each video trial. If a critical error was determined, the adjusted SPM is assigned as 0. The spreadsheets are then sent back to the testing center where the scores are decoded, averaged (two graders score each trial) and recorded for each subject and time point. Table 2 shows the graded video trials from one of the graders for six trials by one subject with time, errors, and adjusted steps. The excel template creates an Adjusted Steps per Min value when graders enter time of start and stop.

TABLE 2

Grading Template - Example of an excel file with calculated adjusted step speed per trial for a set of videos.

| Trial ID | Time start (sec) | Time end (sec) | Total time (calculated) | Unadjusted Steps per min | Major Errors | Critical Error | Adjusted Errors | Adjusted Steps per min (SPM) | Descriptions: error descriptions here |
|---|---|---|---|---|---|---|---|---|---|
| XXX-XXX-153 | 1 | 34 | 33 | 43.64 | 0 | 0 | 0 | 43.64 | No errors, quick pace |
| XXX-XXX-159 | 1 | 39 | 38 | 37.89 | 1 | 0 | 2 | 34.74 | Major error 27 stubs toe on step |
| XXX-XXX-170 | 1 | 60 | 59 | 24.41 | 2 | 0 | 4 | 20.34 | Major error 21 stub toe on step; Major error 39 moves side object |
| XXX-XXX-220 | 1 | | | | | 1 | 1 | 0.00 | Critical error, subject lost |
| XXX-XXX-316 | 1 | 32 | 31 | 46.45 | 0 | 0 | 0 | 46.45 | No errors, quick pace |
| XXX-XXX-318 | 1 | 36 | 35 | 41.14 | 0 | 0 | 0 | 41.14 | No errors, quick pace |

The LLMT algorithm is based on a scoring algorithm also used by a functional reading test, the MNREAD. In the MNREAD, varying sizes of standardized text paragraphs are read by the patient or subject and a trained examiner times the subject and counts the errors until the patient cannot read the print or makes too many errors. The error-adjusted reading speeds are then plotted on a graph and the size of text that aligns with the inflection point of the curve is considered the critical print size, and the fastest speeds or highest plateau of the curve is considered the maximum reading speed. Previously, this inflection point was calculated by manually drawing a two-limb function based on intersection of two straight lines. More recently, a newer curve function used "R"; open source coding was used to create a smooth curve fitting process.

Figure 4:
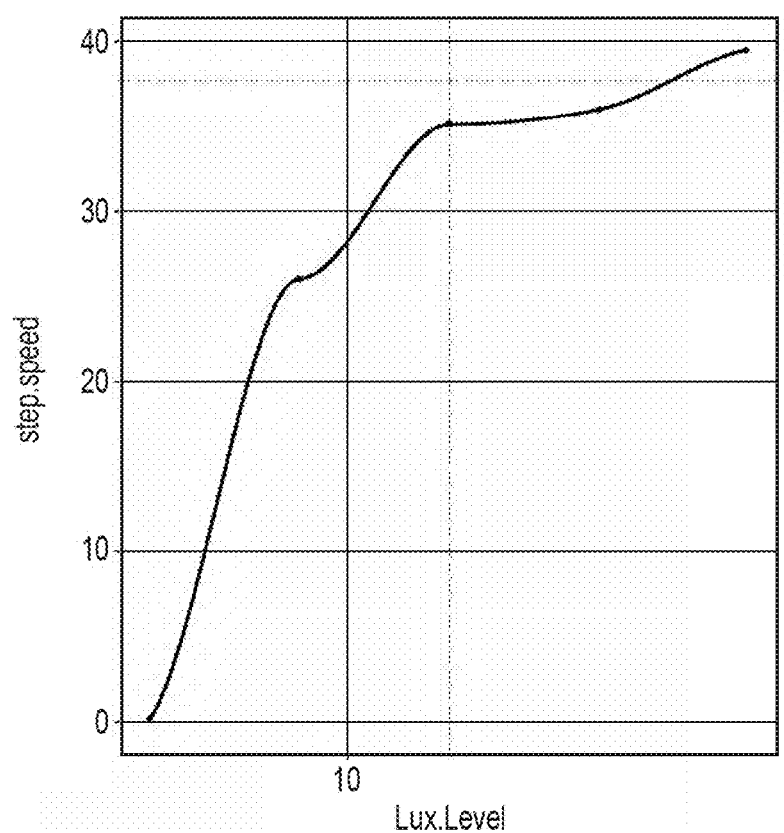
FIG. 4 depicts an example of an R curve for a subject, wherein the vertical dotted line intersecting the x-axis represents the Critical Illumination Level (CIL), which is the light level at which lower light levels would cause the subject to drop in function by a significant amount.
Figure 5:
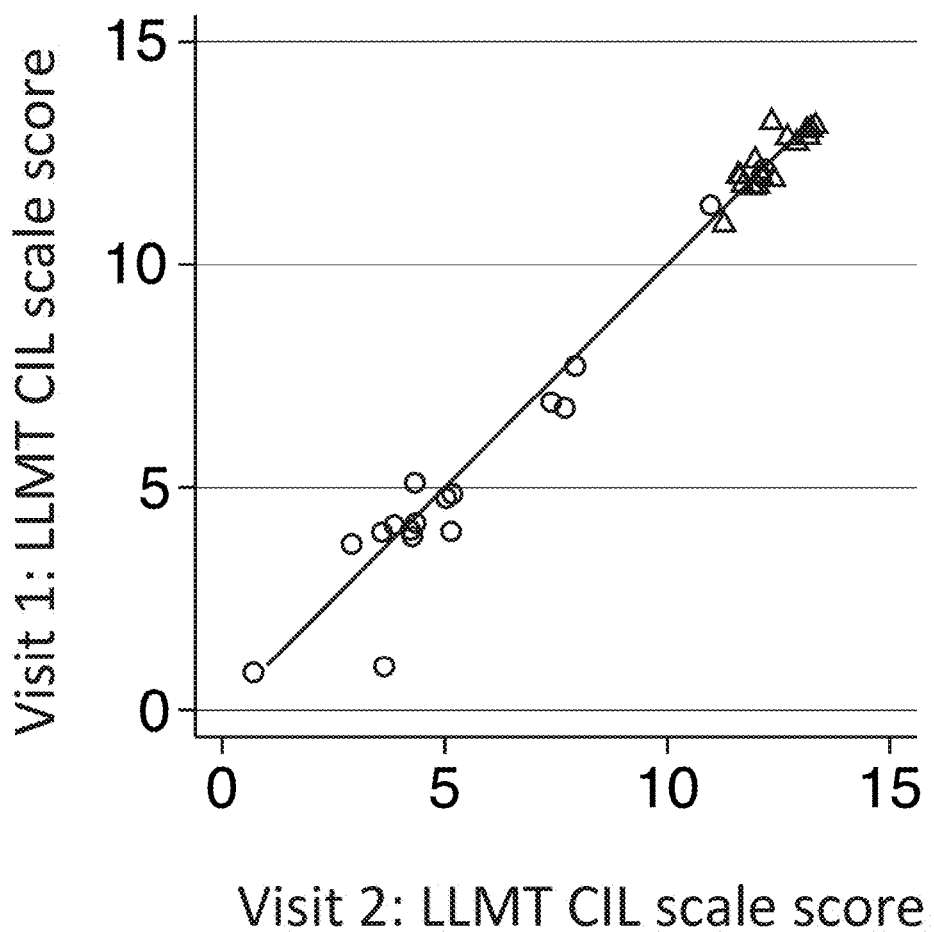
FIG. 5 depicts the visit-to-visit comparison of CIL scores for RP and visually normal (VN) subjects, wherein the circles represent RP subjects, the triangles represent VN subjects, and the solid line is the line of equality. The term "LLMT" refers to Low Luminance Mobility Test.

During early exploratory work of the mobility test, we determined that a single pass/fail point for mobility trials can be challenging and variable depending on the severity of the impairment, balance, and anxiety/risk-taking behavior of subjects in dim lighting, especially in older patients with more mobility comorbidities such as joint pain, vertigo, and general balance difficulties, whether related to vision or not. In addition, some patients with early stages of RP do not strictly "fail" at the lower lighting levels, but their adjusted step speed (i.e., speed and accuracy) may drop significantly at a certain mesopic light level. The LLMT application is designed to identify the first reduction in light level that produces a significant drop in performance by conducting several trials that create a performance curve. The mobility curve represents (i) the lowest lighting at which speed and accuracy are maintained (i.e., Critical Illumination Level, or CIL), and (ii) the average fastest and repeatable stepping speed used to complete the course (i.e., Maximum Step Speed, or MSS) (see FIG. 4). These two aspects of function are valuable for understanding the maximal benefit of an investigational treatment for visual impairment, such as jCell, for future clinical trials both in RP and potentially in other conditions. In the event that a subject has mild visual impairment and performs near the normal level (estimated CIL of 1 lux or less), a low contrast light grey version of either 10% or 25% can be used to increase the sensitivity of the assessment.

LLMT Reliability

As the inclusion criteria was for BCVA 20/80 to 20/800, RP subjects had a broad range of performance levels on the mobility test (Table 3).

Median CIL was 32 lux (e.g., restaurant lighting level) at either visit but three subjects performed in normal low light function ranges (0.12 or 0.25 lux) and two were unable to complete the testing at the highest light levels. The average MSS for those with RP completing the test was 33.6±14.9 steps per minute with no significant difference between visits in either CIL or MSS. This step speed represents a pace of about two seconds per step and the slowest subject took just under five seconds per step. In contrast, VN subjects had an average maximum step speed of 61.00±11.01 spm, which represents approximately 1 step per second and the mean CIL was the lowest measurable level of 0.12 lux.

Figure 6A:
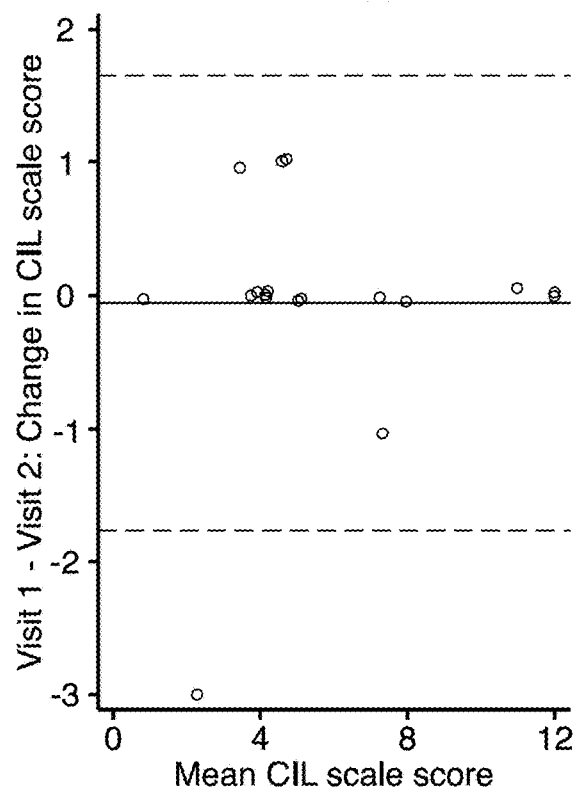
FIG. 6A depicts the change in mobility CIL score over two visits of RP subjects, wherein the center line represents the mean and the upper and lower lines represent two standard deviations from the mean.
Figure 6B:
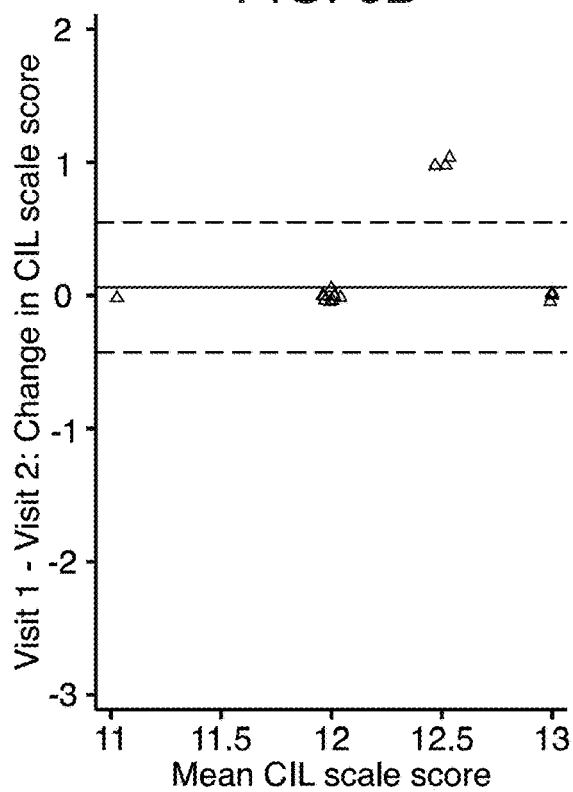
FIG. 6B depicts the change in mobility CIL score over two visits of VN subjects, wherein the center line represents the mean and the upper and lower lines represent two standard deviations from the mean.

Bland-Altman plots in FIGS. 6A and 6B depict both RP and VN subjects spread around the mean. Repeatability was good for 75% of the RP subjects with no change from visit to visit, with Pearson correlation high at 0.98. Four subjects had a CIL change of one light level and one subject had a three-level change (see FIG. 6A) creating a mean change for all subjects of less than half a light level (0.35+/−0.75). The median CIL of RP subjects is a scale score of four corresponding to 32 lux compared to the median CIL of VN of 12 corresponding to 0.12 lux. Of the five subjects with changes from one visit to the next, it was found that each had very small visual field areas remaining, equivalent to <12° diameter, with no peripheral islands. The small visual field area makes it difficult for these subjects to locate and then re-locate the arrows on the LLMT when they lose fixation. The time it takes to search and find the next arrow can be very challenging with a random component and cause variability in navigating side or raised obstacles to step onto or over.

Three out of 16 VN subjects had one light level variability from visit to visit (see FIG. 6B), however the cause of this variability is likely much different from those with impairment. All three subjects could complete the LLMT with lights off (unmeasurable crack of light under the door) on the first visit and then were slightly slower on the second visit. However, with fast step speeds a slight slowing can cause the CIL to drop when there is little deviation from the mean at higher light levels. In contrast, none of the changes visit to visit of RP subjects were related to this exception of fast step speeds or performance with room lights off.

LLMT Content Validity

Content validity is an indication of a test's ability to measure what it claims to measure. Therefore, indicators of content validity for the mobility test can include whether the

TABLE 3

Characteristics and Assessments of Study Population

| | Subpopulation | | | |
| --- | --- | --- | --- | --- |
| | RP (n = 20, study eye) | | VN (n = 16, study eye) | |
| Variable | Min and Max | Mean or Median ± SD | Min and Max | Mean or Median ± SD |
| Age (years) | 25, 72 | 52.20 ± 14.2 | 18, 77 | 43.13 ± 19.49 |
| BCVA (Log MAR) | 0.55, 1.56 | 1.05 ± 0.35 | −0.12, 0.04 | −0.07 ± 0.06 |
| Mean Log Visual Field Area*(deg$^2$) | 0.52, 3.96 | 2.35 ± 1.00 | 4.02, 4.16 | 4.11 ± 0.04 |
| Mean Peak Log Contrast Sensitivity*$^T$ | 0.17, 1.46 | 0.64 ± 0.43 | 1.72, 2.58 | 2.14 ± 0.24 |
| CIL (lux)** | 1000, 0.12 | 32** | 0, 0.25 | 0.12** |
| CIL (scale score)* | −1, 12 | 4** | 13, 11 | 12** |
| Mean MSS (steps per minute) | 14, 67.5** | 33.58 ± 14.93** | 38, 76 | 61.00 ± 11.01 |

*Values are calculated from the mean of two visits.
**Median values used as scale and light levels are not continuous variables.
Two subjects were unable to perform CIL and were assigned an upper limit value for CIL.
$^T$Contrast sensitivity is the inverse of contrast threshold which is a ratio with no units.

low light mobility test: (i) distinguishes those with good vision from those with poor vision and/or (ii) correlates performance results to other known tests of visual function previously demonstrated to be related to mobility. As noted above, significant differences between the RP and VN groups in mean scores and range were demonstrated for mobility.

Figure 7:
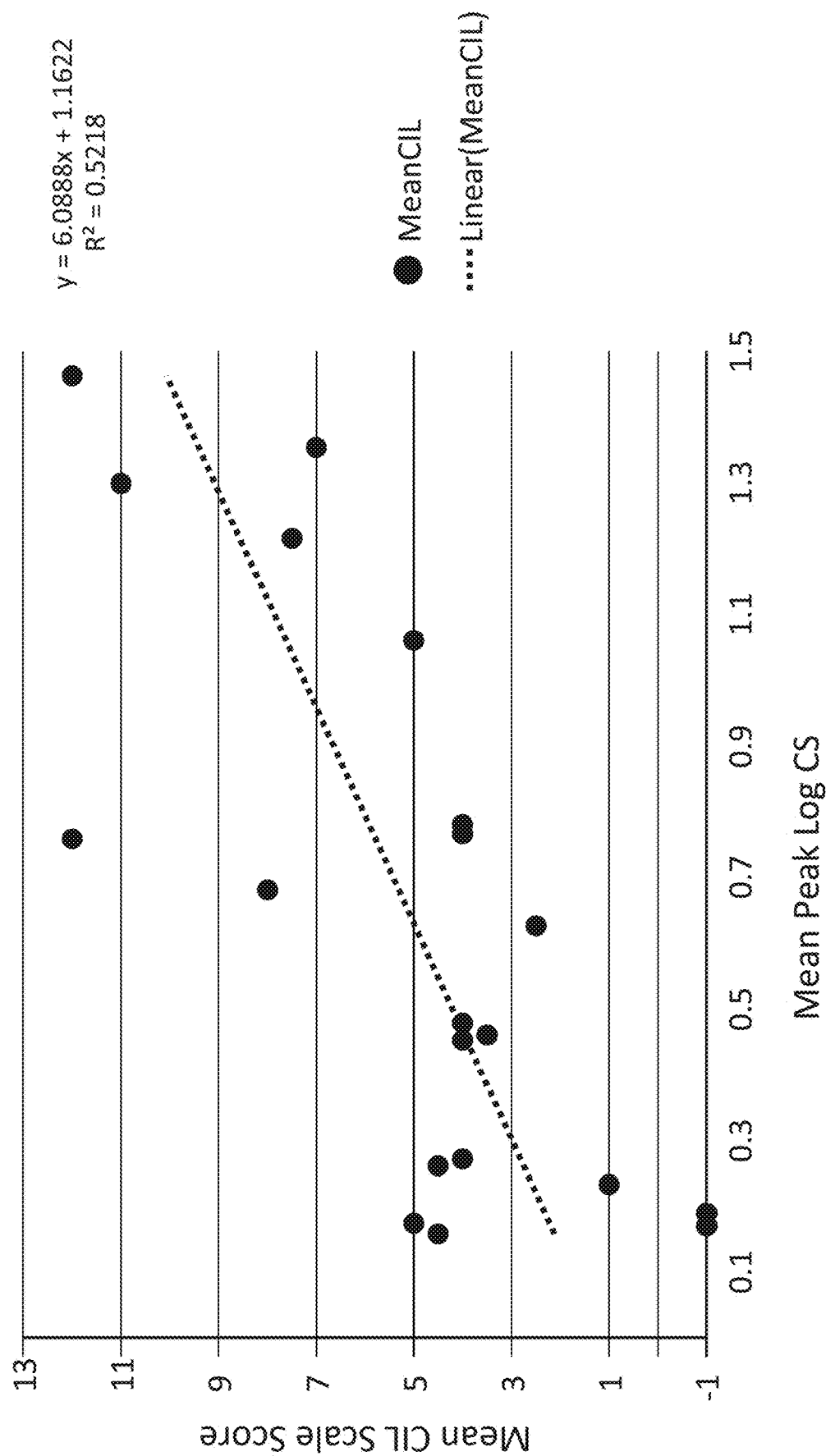
FIG. 7 represents the relationship between CIL score and peak log Contrast Sensitivity (CS).

Many measures of visual function such as contrast sensitivity and remaining visual field area worsen as RP progresses, but high contrast, high luminance visual acuity is often relatively preserved until later in the disease. Therefore, we would expect visual function measures to covary with the performance of the LLMT. Log values were used to calculate visual field, peak contrast sensitivity, and VFQ scores (logits) due to a non-normal sample distribution. MSS and scale scores for CIL were normally distributed and were used for analysis. To test the relationships in the smaller sample (N=20), Pearson correlations were used on individual measures. Multiple regression (MR) was explored but with a small sample size, only relationships with strong $R^2$ values (>0.4) were used due to the chance of the model overfitting the data. In an MR model exploring the variance in CIL, and with independent variables including age, BCVA, VF, CS and VFQ; CS, BCVA and log VF were the greatest contributors to explaining CIL variance. However, due to BCVA and CS being strongly related (r=0.67), both variables should not be kept in the same model. Therefore, assessed with single correlations, CIL scores were strongly and significantly related to peak log CS (r=0.72, p<0.001), FIG. 7, and borderline for log VF area (r=42, p=0.06). Age was not significantly correlated to CIL indicating that patient ability in low light is not strongly dependent on age. Finally, although VFQ-48 overall visual ability was not correlated to CIL, three items were significant (see package labels, see photos, and get around outdoors). The entire mobility scale on the patient-reported outcome VFQ-48 was not significantly correlated but this is not surprising as many RP patients have adapted to their marked vision impairment with use of sighted guides, canes, dog guides, and orientation and mobility training. These subjects therefore often don't respond to mobility items in VFQ-48 as "extremely difficult". These same patients may perform poorly on the LLMT as they are not allowed to use any aids. In addition, although the test on face value is a walking test, it is not designed and does not represent a surrogate for real-life mobility for RP patients for the reasons noted above. Instead it is a functional ability test (walking or stepping) measuring change in ability or function with light and/or contrast level.

In a separate calculation, lower mean luminance/higher CIL scale score (i.e., ability to complete the mobility test in reduced light levels) was significantly related to faster mean step speed (p=0.039).

For studies of RP with a wide range of subject ages, the CIL will be a useful metric for measuring functional low light and/or low contrast mobility. As would be expected, those with better low light function also have better visual acuity, contrast sensitivity, and to a lesser degree, bigger visual fields whereas those with poor light function are slower, and have worse measures of visual function (e.g., more advanced RP).

Figure 8:
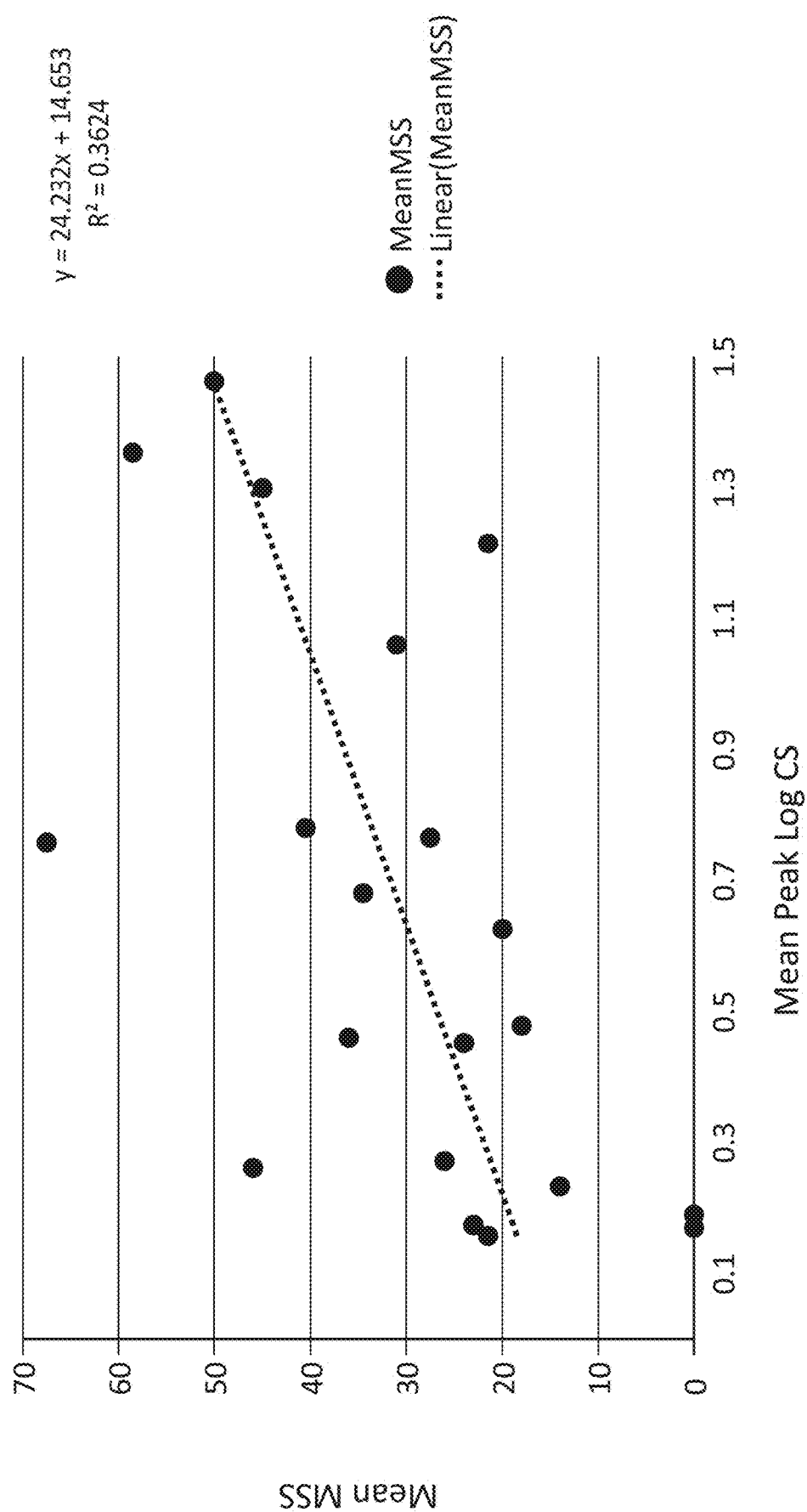
FIG. 8 depicts the relationship between maximum step speed (MSS) and peak log CS.
Figure 9:
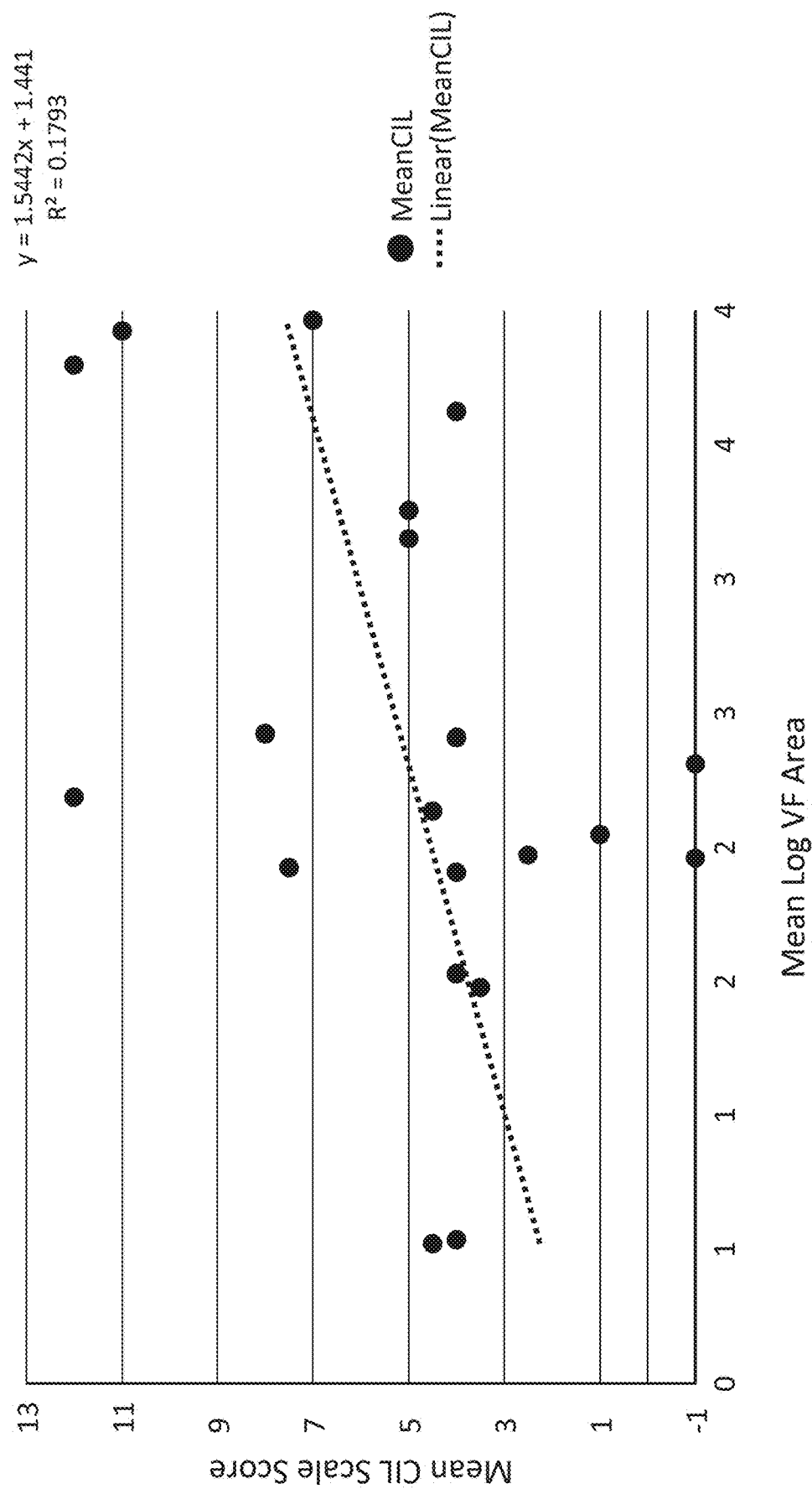
FIG. 9 depicts the relationship between CIL and log Visual Field.

When exploring relationships related to the MSS (step speed) which is a measure of patients better, high illumination function, age is a much more important factor. In a very strong MR model with MSS (step speed), age accounted for most of the variance with CS and VF also contributing to a lesser degree ($R^2$=0.62, p=0.003). Individual correlations of MSS to peak log CS (r=0.60, p<0.01) and MSS to log VF area (r=0.49, p=0.03), can be seen in FIGS. 8 and 9.

Younger subjects tended to be faster than older subjects when measuring above their CIL (higher lighting functional ability). While CS and VF do explain some of the variance in MSS, age was the strongest variable. As this relationship to age was present in both visually normal and RP subjects, it is likely due to other factors such as general slowing in mobility, balance, and even fall related anxiety.

LLMT Test Inter-Rater (Inter-Grader) Reliability

For inter-rater and intra-rater reliability, grading of video trials across three studies were used to allow for the largest sample. At any one time, three orientation and mobility specialists acted as graders by rating performance for video trials. They are called graders in the test administration and will be referred to as Grader 1 (G1), Grader 2 (G2), Grader 3 (G3), and Grader 4 (G4). All graders have been involved in the studies and used the same grading protocol. G1 and G2 were trained simultaneously and began grading mobility in the JC-01E study.

G3 is a vision scientist who understands the testing thoroughly and who acted as a third reviewer for reviewing complex trials when G1 and G2, or G2 and G4 did not agree. Results requiring any adjudication were reviewed by a supervisor, who determined whether a trial should be re-reviewed by the original grader (e.g., typos, obvious misses of errors) or whether it was a challenging subject performance that would benefit from a third review. Very few trials (<1%) were sent to G3; because G3 has less experience than the other graders, his inter-rater and intra-rater agreements are not included here. For inter-grader reliability, all three "routine" graders (G1, G2, and G4) had a sufficient number of trials to evaluate.

Figure 10A:
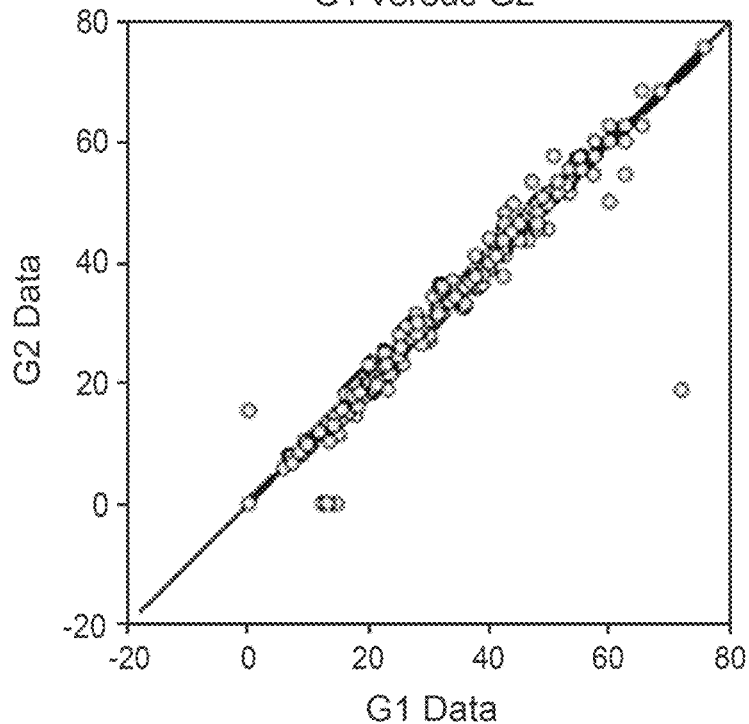
FIG. 10A depicts the limits of agreement (LOA) for the rating of mobility videos between Grader 1 (G1) and Grader 2 (G2).
Figure 10B:
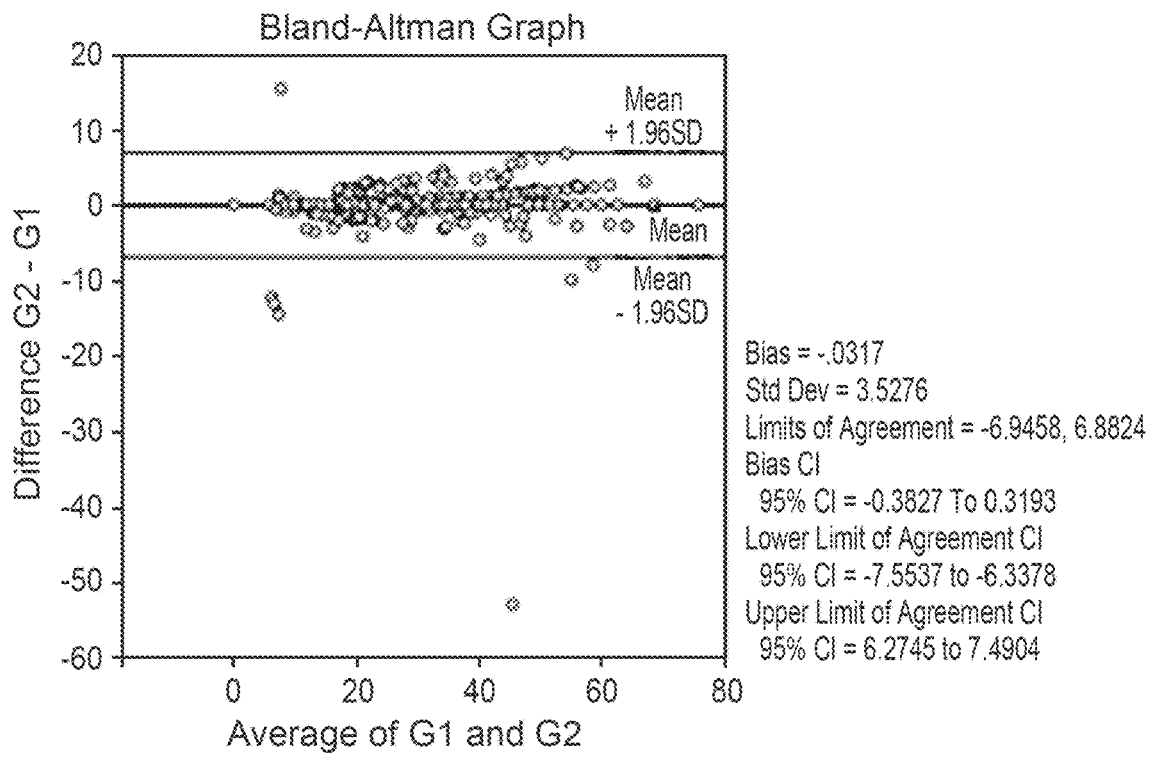
FIG. 10B depicts the LOA for the rating of mobility videos between G1 and G2 using a Bland-Altman graph.
Figure 11A:
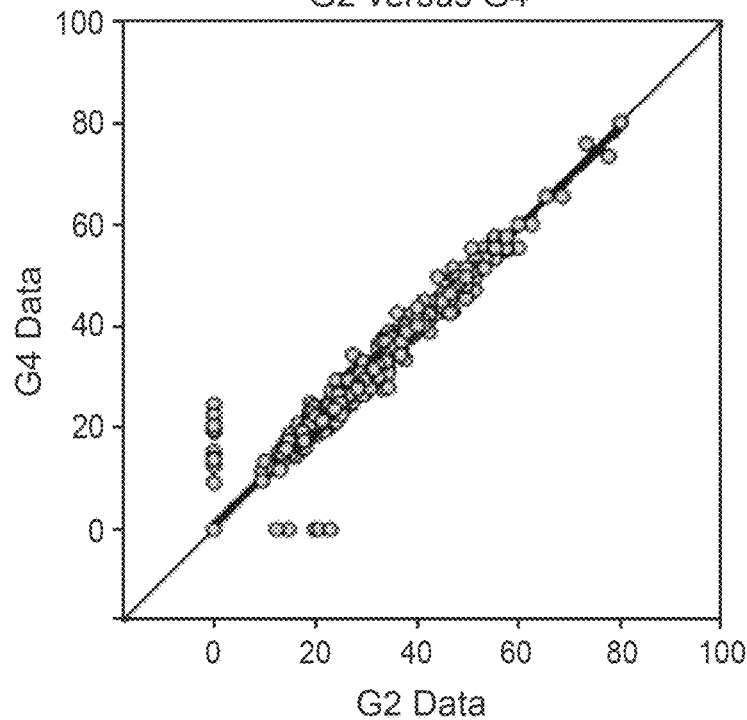
FIG. 11A depicts the LOA for the rating of mobility videos between G2 and Grader 4 (G4).
Figure 11B:
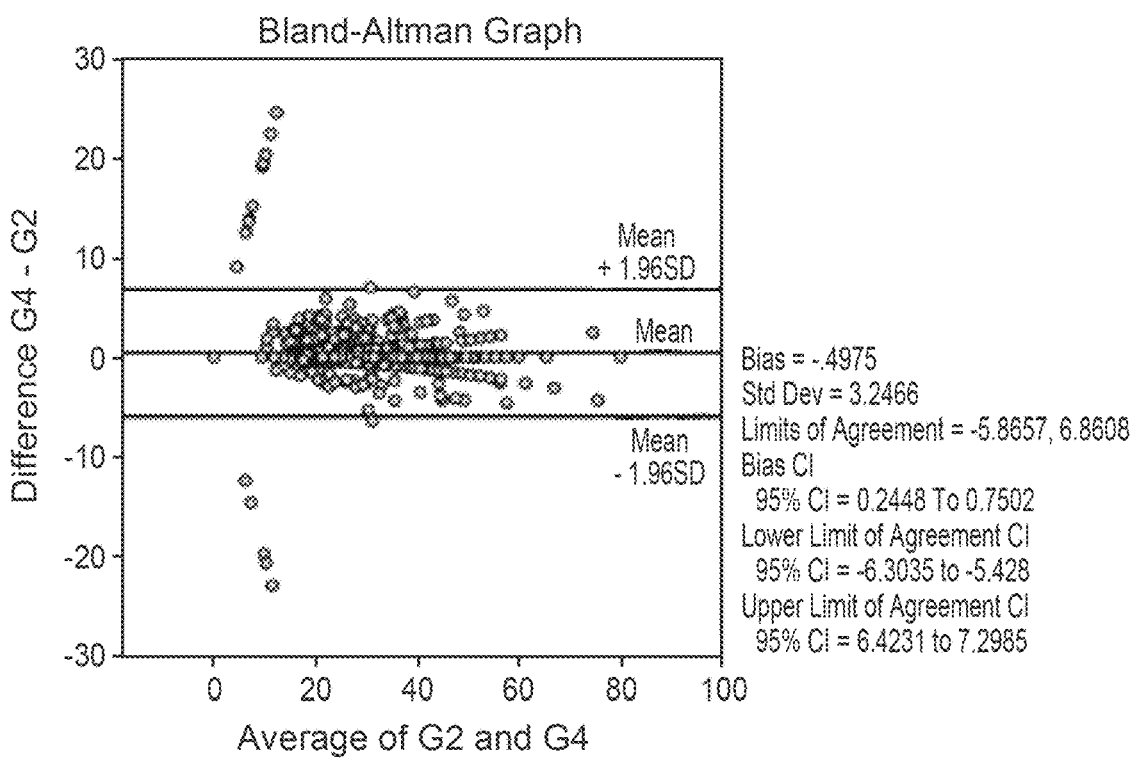
FIG. 11B depicts the LOA for the rating of mobility videos between G2 and G4 using a Bland-Altman graph.
Figure 12A:
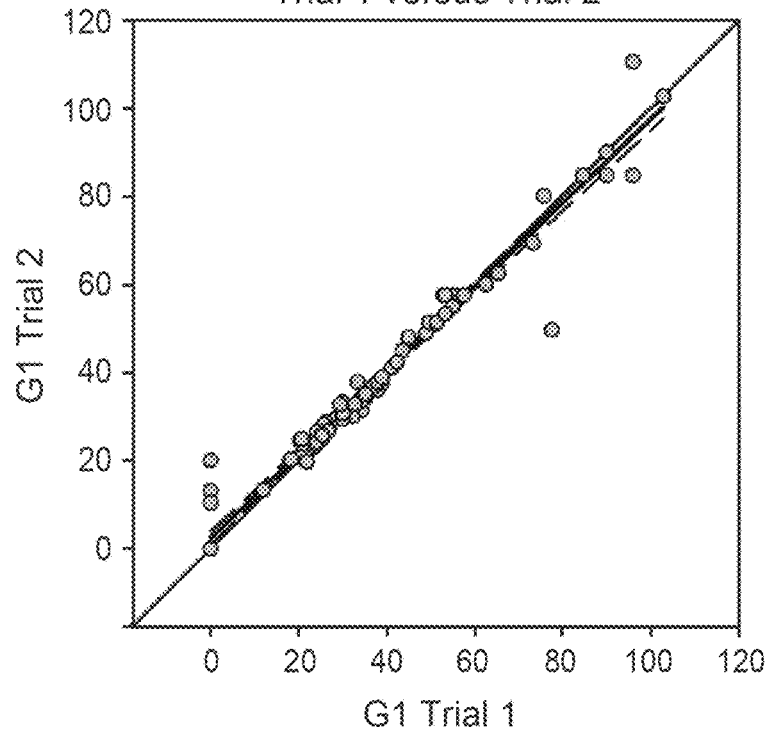
FIG. 12A depicts G1's consistency in grading the same videos twice.
Figure 12B:
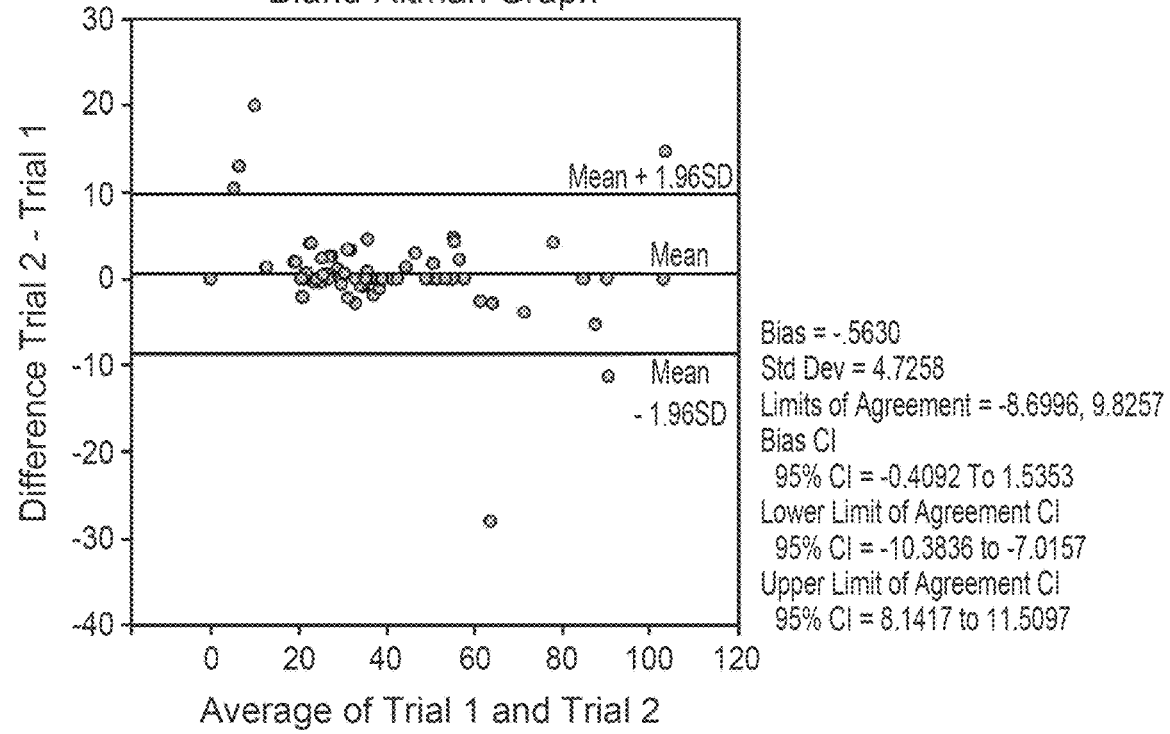
FIG. 12B depicts G1's consistency in grading the same videos twice, represented by a Bland-Altman graph.
Figure 13A:
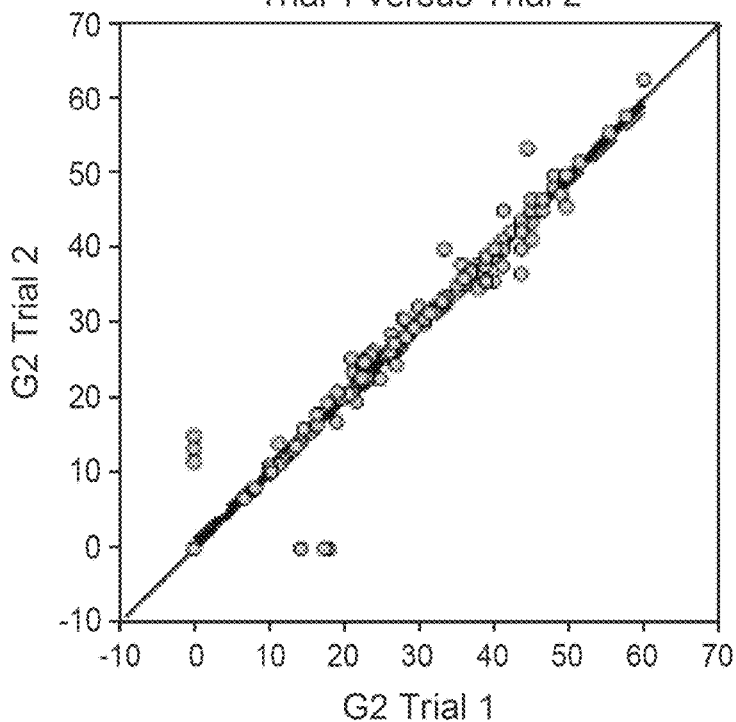
FIG. 13A depicts G2's consistency in grading the same videos twice.
Figure 13B:
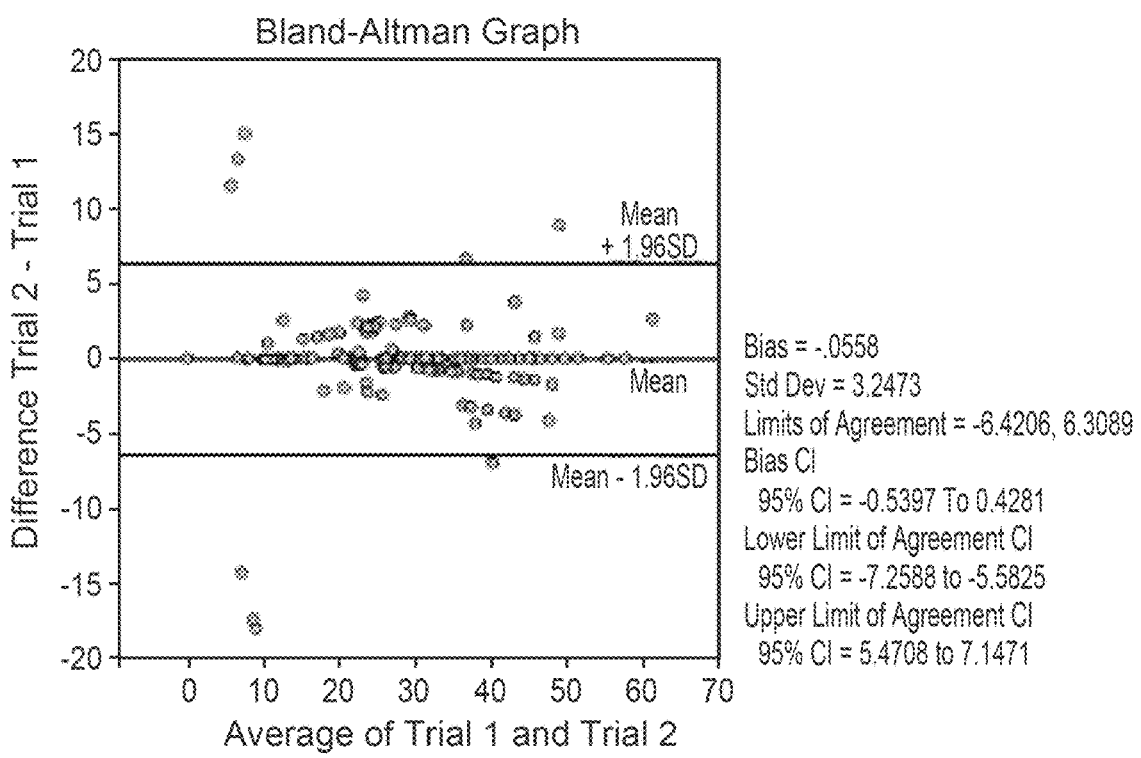
FIG. 13B depicts G2's consistency in grading the same videos twice, represented by a Bland-Altman graph.
Figure 14A:
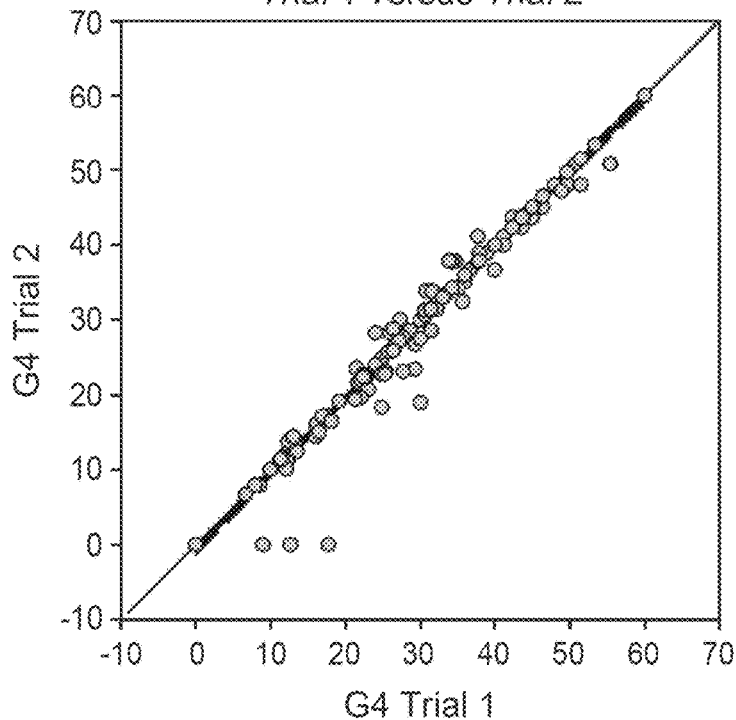
FIG. 14A depicts G4's consistency in grading the same videos twice.
Figure 14B:
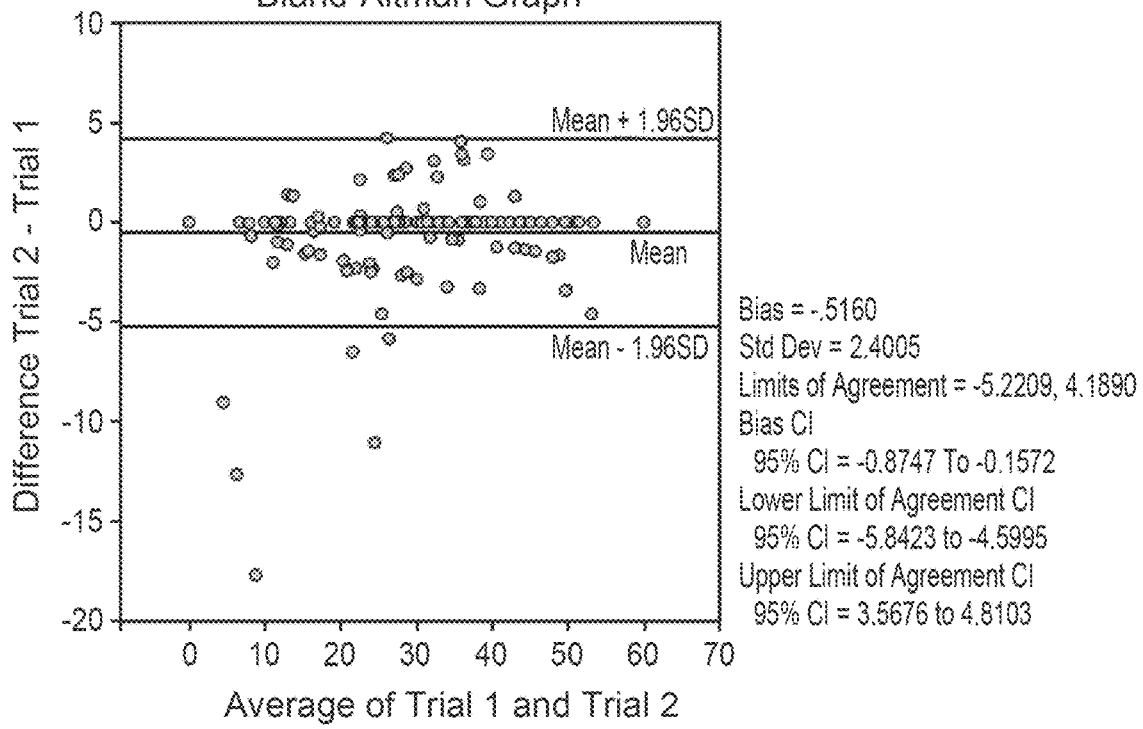
FIG. 14B depicts G4's consistency in grading the same videos twice, represented by a Bland-Altman graph.

The limits of agreement (LOA) describe a range that encompasses the majority of the differences between the two graders. The bias (difference between the 2 readings) for G1 and G2 was −0.0317 and the LOA was −0.0317±6.91 (6.9, −6.94), (see FIG. 10A and FIG. 10B). The data are similar for G2 and G4 with the bias at 0.4975 and the LOA of 0.4975±6.36 (6.9 and −5.9) (see FIG. 11A and FIG. 11B). For both G1 vs G2 and G2 vs G4, most of the data are on the 1:1 line in each figure. The data points at "zero" occur when one grader "fails" the video and the other does not (e.g., 0, 19 sec). This analysis suggests a strong correlation between each set of graders.

For inter-grader reliability, a 2-sample t-test did not find a difference between the data sets of either G1 and G2 (t=0.025, df=776, p=0.98) or between G2 and G4 (t=−0.52, df=1264, p=0.60). The Pearson correlation was 0.980, p<0.001 for G1 and G2 and 0.982, p<0.001 for G2 and G4, indicating a positive correlation.

Therefore, for the two sets of graders, it is rare to find more than a six or seven SPM difference between the graders for any video; this supports the existing process of re-examining videos that have scores from the two graders that differ by more than five SPM.

LLMT Test Intra-Rater (Intra-Grader) Reliability

For intra-grader reliability, G1 had 93 videos that she had graded twice for comparison and G2 had 173 videos that she had graded twice. Grading twice occurs as a natural part of the study as trials from various visits are sent along with current trials to mask the study visit date. As G4 was hired more recently, she had no videos that had been graded twice as part of the studies, but was sent the same 173 videos as G2 to grade a second time. The videos were masked to trial identification by using a random coding system and de-identified by changing the date stamps so that G4 could not compare to her prior grading. A 2-sample t-test did not find a difference between the data sets of G1 when grading and then re-grading the same 93 trials six months later. For G4, 172 trials were graded and re-graded with no difference as well. For each grader the bias ranges were similar (see Table 5 below).

TABLE 5

Characteristics of grader reliability

| Grader | # Videos Graded 2x | t | df | p-value | Bias (LOA) seconds |
|---|---|---|---|---|---|
| G1 | 93 | 0.150 | 184 | 0.88 | 0.56 (−8.1, 10.4) |
| G2 | 173 | 0.032 | 344 | 0.97 | −0.06 (−6.5, 6.3) |
| G4 | 172 | 0.296 | 342 | 0.78 | −0.52 (−5.2, 4.2) |

All three graders demonstrate strong consistency as illustrated in FIG. 12A, FIG. 12B, FIG. 13A, FIG. 13B, FIG. 14A, and FIG. 14B. The Pearson correlation was 0.98, p<0.0001 for G2 and G1, and was 0.99, p<0.0001 for G4, indicating a positive correlation for grading the same video twice. Thus, it can be concluded that the graders are consistent, and that the rubric for grading was simple enough to ensure consistent grading.

In exploring the possible reasons for variability on the mobility test, it was found that all five subjects with visit-to-visit variability were over 40 years of age and all had visual field areas less than 12 degree diameter (Subjects 5, 8, 13, 16, 18). The subject with the most variability (three light levels) was the oldest (72 years) and was also the most variable on the VA LV VFQ-48 with 0.58 logit difference visit to visit. This finding aligns with other investigators' conclusion of higher test-retest variability in patients with severely constricted visual fields.

In reviewing the patterns of the Bland-Altman plots, a consistent pattern with all graders can be seen as the graph has more spread at the slower speeds. At very slow subject step speed, trials are challenging to grade as subjects have multiple errors per trial and presence of a critical error must be determined (SPM=0). When there is disparity on these types of trials between graders, following a review process, the graders must review their trial and reach consensus or they may have to correct an error they made in grading. This results in an initial grading of 0 and a follow-up grading of some value (e.g., 12 SPM). These intra-rater changes result in larger disparities than typically seen. This variability of performance close to the individual fail level is inherent and compensated by the LLMT CIL scoring algorithm. Although one or two of the lowest light levels might be more challenging to grade, the majority of the testing is done in higher light levels and ultimate scoring selects the subjects first significant drop in function in higher lighting rather than depending solely on the pass/fail lowest light point. When subjects have fast trials at all light levels (e.g., 60 SPM), they typically have few errors but when using the scoring algorithm, a difference between trial grading if only one error is noted on one of the trials would cause a larger difference in SPM. For example a fast subject could take 20 seconds with no errors to complete a trial and the algorithm would result in a step speed of 72 SPM, whereas, if the other grader counts the trial with one error, the algorithm (Adjusted Step Speed=[(24−major errors*2)*60]/Time to Complete Test]) produces a step speed of 66 SPM. The difference between the two trials is 6 SPM and cause for review to explore the discrepancy between the two graders.

The algorithm is designed for most subjects who are somewhere in the middle for step speed (e.g., 35 SPM). An example can be a subject with a trial time of 34 seconds and no errors, the step speed would be 42 SPM. Conversely if the other grader notes one error then the speed would be 39 SPM. This difference between graders is only 3 SPM which is within a reasonable difference and would not cause a need to review the video trials. See example of trials in FIG. 15 for a subject in an average, consistent step speed range.

In the VN group, three subjects varied by one light level on repeat testing but as they were each near 40 years of age, it is more likely their variability is due to their very fast step speed and slight grading differences as opposed to true variation in low light performance or age-related factors.

Low Contrast Low Luminance Mobility Test (LC-LLMT)

During testing of subjects who have better performance on the LLMT (e.g., fast pace or near-normal CIL) at baseline, it was determined that another test variant was needed removing the ceiling effect in a proportion of subjects. The purpose is to avoid grading variability and to avoid a ceiling effect in a treatment study when testing better functioning subjects (less severe disease stages). In this validation study (n=20 RP), three subjects were 0.5 lux CIL or better indicating better functional vision despite visual acuity ranges typically corresponding to severe disease stage.

Figure 16:
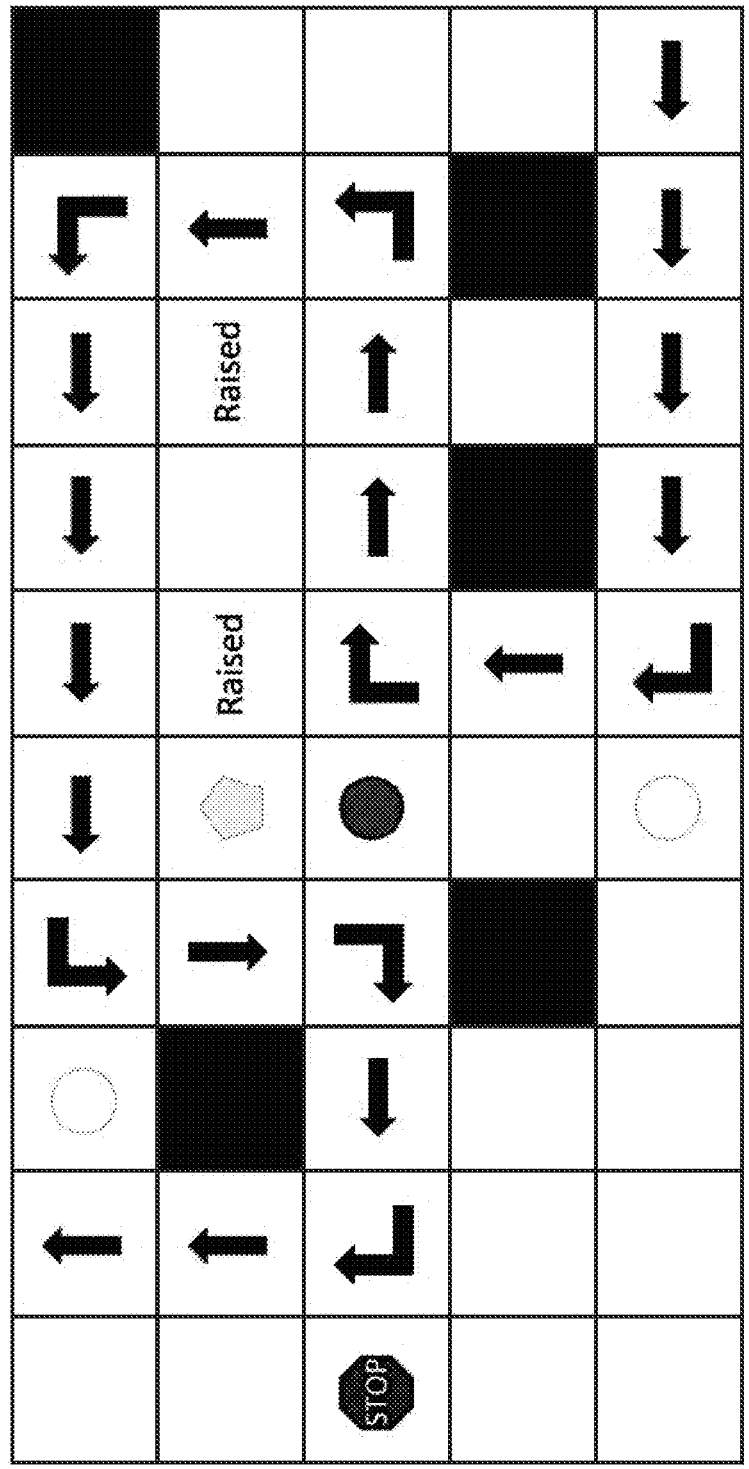
FIG. 16 is a schematic of a low contrast course, in accordance with some embodiments. The yellow pentagonal symbol represents a small traffic sign about hip height that has a yield sign. The grey circle represents the trashcan obstacle (e.g., a small plastic oval shaped bin). The red stop sign is like the yield sign. The open circles represent two white traffic cones (no contrast). The raised squares represent lightly weighted foam square obstacles. The black squares represent holes in the ground and so the foot must not be entirely in the square or it is a major penalty. All the pre-printed placements are all adjacent to the arrows.

Early in mobility test development, a thin arrow maze pattern was designed and used to test better performing subjects, along with the thick or standard size of arrows. In pilot testing, it was found to generally reduce the CIL by 1-2 levels. For example, a patient who performed at 0.25 lux CIL on the standard maze would perform at 0.5 or 1.0 lux CIL on the "thin arrow" maze. As this can extend the test range to some degree, other test versions sensitive over a broader range in performance were considered. A low contrast version with light grey arrows against a white background was designed and initially explored qualitatively with better functioning subjects. During pilot test development, various shades of grey arrows against white backgrounds were qualitatively explored in patients with RP. Maze patterns were designed with weber's contrast values of 50%, 30%, 25% and 10%. Each version was explored with RP subjects of various BCVA and visual field characteristics who each passed all levels of the high contrast version (black and white). The most sensitive versions in which participants could still complete some but not all light levels included the 25% contrast and 10% versions (see FIG. 16). Most of these better functioning (less severe RP) participants could not do the 10% version, especially if their peak contrast sensitivity was essentially flat or non-testable, but having a lower contrast option does provide a range of testing that extends to those with more preserved visual function. The process for determining which version would be used for a specific subject and eye (in the case of monocular testing) is as follows: performance at a baseline visit would be assessed at the high contrast level (black and white, 95%). For subjects with high contrast CIL (e.g., better than or equal to one lux) 25% and 10% contrast versions would be assessed. Starting at one lux provides a range in the mesopic light levels that then extends into scotopic ranges during testing. This range would provide several levels for potential improvement in a treatment study. If the 10% version could not be completed at any light level, the 25% grey version would be used. Any following or later visits would be performed with the same version (10%, 25%, or high contrast) to maintain consistency. It is possible that one eye could test with one version (e.g., 10%) and the other eye could test with the high contrast version. In the case of binocular testing, the more challenging version that allows room for improvement would be used.

EQUIVALENTS

While the present invention has been described in conjunction with the specific embodiments set forth above, many alternatives, modifications and other variations thereof will be apparent to those of ordinary skill in the art. All such alternatives, modifications, and variations are intended to fall within the spirit and scope of the present invention.

What is claimed is:

1. A method of testing functional vision of a subject, the method comprising:
   a) selecting a first course from a plurality of courses, each course having a grid of sections that comprises a beginning point, at least one turn, at least one obstacle, and an ending point, wherein: the grid of sections is pre-printed on an overall map for the subject; a plurality of the sections each includes a directional arrow, the directional arrows forming a path for the subject to walk on; at least one of the sections includes the at least one obstacle; and the at least one obstacle includes a physical object requiring avoidance, circumvention, traversal, and/or aversion;
   b) selecting a first illumination level from 13 illumination levels, wherein: the 13 illumination levels range from about 0.12 lux to about 500 lux; and each illumination level is spaced from an adjacent illumination level by about 0.3 log units;
   c) illuminating the first course with the first illumination level;
   d) recording by video a first movement of the subject on the first course starting from the beginning point; and
   e) determining a first step speed of the subject based on the first movement;
   f) selecting a second course from the plurality of courses, wherein the second course is different from the first course;
   g) selecting a second illumination level from the 13 illumination levels, wherein the second illumination level is different from the first illumination level;
   h) illuminating the second course with the second illumination level;
   i) recording by video a second movement of the subject on the second course starting from the beginning point;
   j) determining a second step speed of the subject based on the second movement;
   k) repeating steps (f)-(j) such that the subject is tested on four to eight courses at different illumination levels;
   l) producing a mobility curve showing the step speeds as a function of the illumination level; and
   m) determining a critical illumination level (CIL) for the subject based on the mobility curve, below which the subject's step speed decreases significantly,
   wherein each step speed is calculated by the following formula: step speed=[(24−the number of major errors*2)*60]/the time to complete each course, wherein the time to complete each course has a unit of seconds,
   wherein each major error is selected from: a majority of a foot stepping into an area outside the path, skipping one directional arrow, moving the at least one obstacle by more than 4 inches, misjudging a height of the at least one obstacle, stepping into a solid black square by half a foot or more, and misjudging the end of the path but successfully completing the path.

2. The method of claim 1, wherein when the subject commits a critical error, the step speed is zero, the critical error being selected from: skipping two or more sections on the path, getting lost for at least five seconds, and misjudging heights of all three in-path raised obstacles.

3. The method of claim 1, wherein the subject:
   (i) has normal functional vision; or
   (ii) is suspected of having vision impairment or deficiency in one or both eyes.

4. The method of claim 1, wherein the subject is a candidate for local or systemic ophthalmic treatment.

5. The method of claim 4, wherein the local or systemic ophthalmic treatment is ocular therapy, surgery, gene therapy, or a combination thereof, for one or both eyes.

6. The method of claim 5, wherein the ocular therapy, surgery, or the gene therapy is for treatment of retinitis pigmentosa (RP), Leber's congenital amaurosis (LCA), Stargardt disease, Usher's syndrome, choroideremia, a rod-cone or cone-rod dystrophy, a ciliopathy, a mitochondrial disorder, progressive retinal atrophy, a degenerative retinal disease, age related macular degeneration (AMD), wet AMD, dry AMD, geographic atrophy, a familial or acquired maculopathy, a retinal photoreceptor disease, a retinal pigment epithelial-based disease, diabetic retinopathy, cystoid macular edema, uveitis, retinal detachment, traumatic retinal injury, iatrogenic retinal injury, macular holes, macular telangiectasia, a ganglion cell disease, an optic nerve cell disease, glaucoma, optic neuropathy, ischemic retinal disease, retinopathy of prematurity, retinal vascular occlusion, familial macroaneurysm, a retinal vascular disease, an ocular vascular diseases, a vascular disease, or ischemic optic neuropathy.

7. The method of claim 5, performed:
   (i) prior to the subject undergoing the ocular therapy, surgery, and/or gene therapy;
   (ii) during the subject undergoing the ocular therapy, surgery, and/or gene therapy; or
   (iii) after the subject has undergone the ocular therapy, surgery, and/or gene therapy.

8. The method of claim 5, repeated over a recovery period of the subject to monitor improvement or decline associated with the ocular therapy, surgery, and/or gene therapy.

9. The method of claim 1, wherein each course comprises one to about 15 turns.

10. The method of claim 1, wherein each course comprises one to about 15 obstacles.

11. The method of claim 1, wherein the at least one obstacle is selected from: an object placed in the path, an object placed adjacent to the path, a raised section, a section having a color indicative of obstacle, and an edge of a step.

12. The method of claim 1, wherein the plurality of courses includes at least 12 courses.

13. The method of claim 1, wherein the CIL for a subject with normal functional vision is about 0.12 lux.

14. The method of claim 1, further comprising determining a maximum step speed (MSS) for the subject, wherein the MSS is an average of the step speeds determined for the illumination levels at or above the CIL.

15. The method of claim 14, wherein the MSS for a subject with normal functional vision is about 61 spm.

16. A method of monitoring the progress of a subject that is undergoing or has received local or systemic ophthalmic treatment, the method comprising:
   determining a first MSS of the subject using the method of claim 14 at a first time point;

determining a second MSS of the subject using the method of claim 14 at a second time point, the second time point being later than the first time point;

comparing the first MSS with the second MSS; and determining that the subject is: (a) making progress if the second MSS is significantly greater than the first MSS, or (b) not making progress or becoming more visually impaired if the second MSS is the same as or less than the first MSS.

17. The method of claim 1, wherein when the CIL of the subject is no more than one lux, the method further comprising selecting a course with a Weber contrast value of about 10% to about 50%.

18. A method of monitoring the progress of a subject that is undergoing or has received local or systemic ophthalmic treatment, the method comprising:

determining a first CIL of the subject using the method of claim 1 at a first time point;

determining a second CIL of the subject using the method of claim 1 at a second time point, the second time point being later than the first time point;

comparing the first CIL with the second CIL; and determining that the subject is: (a) making progress if the second CIL is significantly less than the first CIL, or (b) not making progress or becoming more visually impaired if the second CIL is the same as or greater than the first CIL.

19. A method of testing functional vision of a subject, the method comprising:

selecting a first course from a plurality of courses each course having a grid of sections that comprises a beginning point, at least one turn, at least one obstacle, and an ending point, wherein: the grid of sections is pre-printed on an overall map for the subject; a plurality of the sections each includes a directional arrow, the directional arrows forming a path for the subject to walk on; at least one of the sections includes the at least one obstacle; and the at least one obstacle includes a physical object requiring avoidance, circumvention, traversal, and/or aversion;

selecting a first illumination level from a plurality of illumination levels;

illuminating the first course with the first illumination level;

recording by video a first movement of the subject on the first course starting from the beginning point;

determining a first step speed of the subject based on the first movement;

selecting a second course from the plurality of courses, wherein the second course is different from the first course;

selecting a second illumination level from the plurality of illumination levels, wherein the second illumination level is different from the first illumination level;

illuminating the second course with the second illumination level;

recording by video a second movement of the subject on the second course starting from the beginning point;

determining a second step speed of the subject based on the second movement;

producing a mobility curve showing the first and second step speeds as a function of the illumination level; and determining a critical illumination level (CIL) for the subject based on the mobility curve, below which the subject's step speed decreases significantly.

20. A system for testing functional vision of a subject, the system comprising:

a plurality of courses configured to facilitate performing the test, each course having a grid of sections that comprises a beginning point, at least one turn, at least one obstacle, and an ending point, wherein: the grid of sections is pre-printed on an overall map for the subject; a plurality of the sections each includes a directional arrow, the directional arrows forming a path for the subject to walk on; at least one of the sections includes the at least one obstacle; and the at least one obstacle includes a physical object requiring avoidance, circumvention, traversal, and/or aversion;

a plurality of lights configured to control an illumination level;

a light meter configured to determine the illumination level;

a video-recording device configured to record a movement of the subject as the subject walks on the path; and a computing process configured to determine a critical illumination level (CIL) for the subject, below which the subject's step speed decreases significantly.

* * * * *